(12) United States Patent
Hirschmann et al.

(10) Patent No.: US 7,658,978 B2
(45) Date of Patent: Feb. 9, 2010

(54) LIQUID CRYSTALLINE MEDIUM

(75) Inventors: Harald Hirschmann, Darmstadt (DE); Volker Reiffenrath, Rossdorf (DE)

(73) Assignee: Merck Patent Gesellschaft, Darmstadt (DE)

( * ) Notice: Subject to any disclaimer, the term of this patent is extended or adjusted under 35 U.S.C. 154(b) by 0 days.

(21) Appl. No.: 12/374,063

(22) PCT Filed: Jul. 16, 2007

(86) PCT No.: PCT/EP2007/006286

§ 371 (c)(1), (2), (4) Date: Jan. 16, 2009

(87) PCT Pub. No.: WO2008/009398

PCT Pub. Date: Jan. 24, 2008

(65) Prior Publication Data

US 2009/0230354 A1    Sep. 17, 2009

(30) Foreign Application Priority Data

Jul. 17, 2006  (EP)  .................. 06014805

(51) Int. Cl.
*C09K 19/30* (2006.01)
*C09K 19/12* (2006.01)

(52) U.S. Cl. ............... 428/1.1; 252/299.63; 252/299.66

(58) Field of Classification Search .................. 428/1.1; 252/299.63, 299.66
See application file for complete search history.

(56) References Cited

U.S. PATENT DOCUMENTS

| | | | |
|---|---|---|---|
| 5,102,578 A | 4/1992 | Buchecker et al. | |
| 5,989,452 A * | 11/1999 | Kato et al. | 252/299.63 |
| 6,174,457 B1 * | 1/2001 | Kato et al. | 252/299.63 |
| 6,207,076 B1 * | 3/2001 | Koga et al. | 252/299.63 |
| 7,455,894 B2 | 11/2008 | Wittek et al. | |

FOREIGN PATENT DOCUMENTS

| | | |
|---|---|---|
| DE | 10152831 A1 | 7/2002 |
| DE | 102006006116 A1 | 8/2006 |
| EP | 0355552 A2 | 2/1990 |
| EP | 1447435 A | 8/2004 |

* cited by examiner

*Primary Examiner*—Shean C Wu
(74) *Attorney, Agent, or Firm*—Millen, White, Zelano & Branigan, P.C.

(57) ABSTRACT

The invention relates to a liquid crystalline medium containing one or more compounds of formula I, wherein $R^1$ and $R^2$ have the meanings described in claim 1, to its use for electrooptical purposes, and to displays containing this medium.

(I)

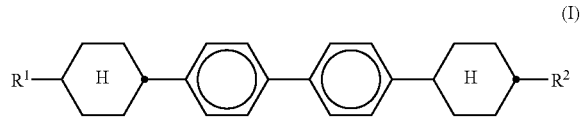

10 Claims, No Drawings

LIQUID CRYSTALLINE MEDIUM

The present invention relates to a liquid crystalline medium, to its use for electro-optical purposes, and to displays containing this medium.

Liquid crystals are used principally as dielectrics in display devices, since the optical properties of such substances can be modified by an applied voltage. Electro-optical devices based on liquid crystals are extremely well known to the person skilled in the art and can be based on various effects. Examples of such devices are cells having dynamic scattering, DAP (deformation of aligned phases) cells, guest/host cells, TN cells having a twisted nematic structure, STN (supertwisted nematic) cells, SBE (super-birefringence effect) cells and OMI (optical mode interference) cells. The commonest display devices are based on the Schadt-Helfrich effect and have a twisted nematic structure.

The liquid crystal materials must have good chemical and thermal stability and good stability to electric fields and electromagnetic radiation. Also, the liquid crystal materials should have low viscosity and produce short addressing times and high contrast in the cells.

They should furthermore have a suitable mesophase, for example a nematic or cholesteric mesophase for the above-mentioned cells, at the usual operating temperatures, i.e. in the broadest possible range above and below room temperature. Since liquid crystals are generally used as mixtures of a plurality of components, it is important that the components are readily miscible with one another. Further properties, such as the electrical conductivity, the dielectric anisotropy and the optical anisotropy, have to satisfy various requirements depending on the cell type and area of application. For example, materials for cells having a twisted nematic structure should have positive dielectric anisotropy and low electrical conductivity.

For example, for matrix liquid crystal displays with integrated non-linear elements for switching individual pixels (MLC displays), media having large positive dielectric anisotropy, broad nematic phases, relatively low birefringence, very high specific resistance, good UV and temperature stability and low vapour pressure are desired.

Matrix liquid crystal displays of this type are known. Non-linear elements, which can be used for individual switching of the individual pixels are, for example, active elements (i.e. transistors). The term "active matrix" is then used, where a distinction can be made between two types:

1. MOS (metal oxide semiconductor) or other diodes on a silicon wafer as substrate.
2. Thin-film transistors (TFTs) on a glass plate as substrate.

The use of single-crystal silicon as substrate material restricts the display size, since even modular assembly of various part-displays results in problems at the joins.

In the case of the more promising type 2, which is preferred, the electro-optical effect used is usually the TN effect. A distinction is made between two technologies: TFTs comprising compound semiconductors, such as, for example, CdSe, or TFTs based on polycrystalline or amorphous silicon.

The TFT matrix is applied to the inside of one glass plate of the display, while the other glass plate carries the transparent counterelectrode on its inside. Compared with the size of the pixel electrode, the TFT is very small and has virtually no adverse effect on the image. This technology can also be extended to fully colour-capable displays, in which a mosaic of red, green and blue filters is arranged in such a way that a filter element is opposite each switchable pixel.

The TFT displays usually operate as TN cells with crossed polarisers in transmission and are illuminated from the back.

The term MLC displays here covers any matrix display with integrated non-linear elements, i.e., besides the active matrix, also displays with passive elements, such as varistors or diodes (MIM=metal-insulator-metal).

MLC displays of this type are particularly suitable for TV applications (for example pocket TVs) or for high-information displays for computer applications (laptops) and in automobile or aircraft construction. Besides problems regarding the angle dependence of the contrast and the response times, difficulties also arise in MLC displays due to insufficiently high specific resistance of the liquid crystal mixtures [TOGASHI, S., SEKIGUCHI, K., TANABE, H., YAMAMOTO, E., SORIMACHI, K., TAJIMA, E., WATANABE, H., SHIMIZU, H., Proc. Eurodisplay 84, September 1984: A 210-288 Matrix LCD Controlled by Double Stage Diode Rings, p. 141 ff, Paris; STROMER, M., Proc. Eurodisplay 84, September 1984: Design of Thin Film Transistors for Matrix Addressing of Television Liquid Crystal Displays, p. 145 ff, Paris]. With decreasing resistance, the contrast of an MLC display deteriorates, and the problem of after-image elimination may occur. Since the specific resistance of the liquid crystal mixture generally drops over the life of an MLC display owing to interaction with the interior surfaces of the display, a high (initial) resistance is very important in order to obtain acceptable service lives. In particular in the case of low-volt mixtures, it was hitherto impossible to achieve very high specific resistance values. It is furthermore important that the specific resistance exhibits the smallest possible increase with increasing temperature and after heating and/or UV exposure. The low-temperature properties, in particular the so-called "low temperature stability" (LTS) of the mixtures from the prior art are also particularly disadvantageous. It is demanded that no crystallisation and/or smectic phases occur, even at low temperatures, and the temperature dependence of the viscosity is as low as possible. The MLC displays from the prior art thus do not meet today's requirements.

There thus continues to be a great demand for MLC displays having very high specific resistance at the same time as a large working-temperature range, short response times even at low temperatures which do not have these disadvantages, or only do so to a reduced extent.

In TN (Schadt-Helfrich) cells, media are desired which facilitate the following advantages in the cells:
  extended nematic phase range (in particular down to low temperatures)
  the ability to switch at extremely low temperatures (outdoor use, automobile, avionics)
  increased resistance to UV radiation (longer service life).

The media available from the prior art do not allow these advantages to be achieved while simultaneously retaining the other parameters.

In the case of supertwisted (STN) cells, media are desired which enable greater multiplexability and/or lower threshold voltages and/or broader nematic phase ranges (in particular at low temperatures). To this end, a further widening of the available parameter latitude (clearing point, smectic-nematic transition or melting point, viscosity, dielectric parameters, elastic parameters) is urgently desired.

For TV and monitor applications, media are desired which have a fast response time and a low threshold voltage, furthermore a good low temperature stability are required. Also, depending on the thickness of the switchable LC layer, a high birefringence may be required.

The present invention thus has the object of providing media, in particular for MLC, TN or STN displays of this type, which do not have the above-mentioned disadvantages or only do so to a reduced extent, and preferably simultaneously have a high clearing point and a low rotational viscosity, and further preferably exhibit fast switching times, high specific resistance, low threshold voltage, and an improved LTS.

It has now been found that this object can be achieved if media according to the invention are used in displays.

The present invention thus relates to a liquid crystal medium containing one or more compounds of formula I,

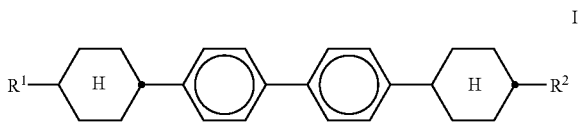

wherein $R^1$ and $R^2$ are independently of one another an alkenyl or alkenyloxy group having from 2 to 9 carbon atoms.

In the pure state, the compounds of formula I are colourless and form liquid crystalline mesophases in a temperature range which is favourably located for electro-optical use. They are stable chemically, thermally and to light.

$R^1$ and $R^2$ in formula I are preferably unsubstituted straight-chain alkenyl having from 2 to 9, especially preferred 2, 3, 4 or 5 C-atoms.

Especially preferred compounds of formula I are those selected of the following formulae

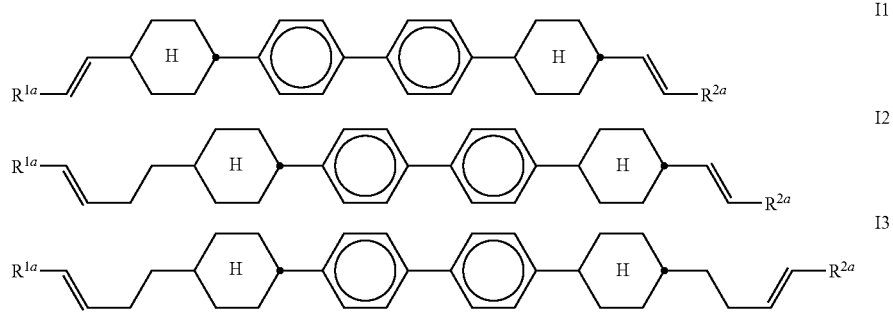

wherein $R^{1a}$ and $R^{2a}$ are independently of each other H, $CH_3$, $C_2H_5$ or n-$C_3H_7$.

Especially preferred are compounds wherein $R^{1a}$ and $R^{2a}$ are selected from H or $CH_3$, in particular wherein $R^{1a}$ and $R^{2a}$ are H, most preferably those of formula I1, wherein $R^{1a}$=$R^{2a}$=H.

The compounds of formula I are prepared by methods known per se, as described in the literature (for example in the standard works, such as Houben-Weyl, Methoden der organischen Chemie [Methods of Organic Chemistry], Georg-Thieme-Verlag, Stuttgart), to be precise under reaction conditions which are known and suitable for the said reactions. Use can also be made here of variants which are known per se, but are not mentioned here in greater detail.

The invention also relates to electro-optical displays (in particular STN or MLC displays having two plane-parallel outer plates, which, together with a frame, form a cell, integrated non-linear elements for switching individual pixels on the outer plates, and a nematic liquid crystal mixture of positive dielectric anisotropy and high specific resistance which is located in the cell) which contain media of this type, and to the use of these media for electro-optical purposes. The mixtures according to the invention are also suitable for IPS (in plane switching) applications, OCB (optically controlled birefringence) applications, FFS (Fringe Field Switching) applications, VA (vertical alignment) applications.

The liquid crystal mixtures according to the invention enable a significant widening of the available parameter latitude. Especially, it was found that by using liquid crystal mixtures comprising compounds of formula I, it is possible to obtain mixtures having a low rotational viscosity and fast switching time, whilst maintaining a high clearing point.

The achievable combinations of clearing point, rotational viscosity $\gamma_1$, low optical anisotropy $\Delta n$ and dielectric anisotropy $\Delta\epsilon$ are far superior to previous materials from the prior art.

The requirement for a high clearing point, a nematic phase at low temperature and a high positive $\Delta\epsilon$ has hitherto only been achieved to an inadequate extent. Although there are prior art mixtures, like for example MLC-6424, that have high positive $\Delta\epsilon$, they only have a low value of the clearing point and a high value for the rotational viscosity $\gamma_1$. Other mixture systems have good flow viscosities $v_{20}$ and $\Delta\epsilon$ values, but only have clearing points in the region of 60° C.

The liquid crystal mixtures according to the invention, while retaining the nematic phase down to −20° C., preferably down to −30° C. and particularly preferably down to −40° C., enable clearing points above 65° C., preferably above 75° C. and particularly preferably above 80° C., simultaneously dielectric anisotropy values $\Delta\epsilon$ of $\geq 3.0$, preferably $\geq 4.5$, and a high value for the specific resistance to be achieved, enabling excellent STN and MLC displays to be obtained. In particular, the mixtures are characterised by low operating voltages. The TN thresholds are below 2.5 V, preferably below 2.1 V, particularly preferably below 2.0 V.

It goes without saying that, through a suitable choice of the components of the mixtures according to the invention, it is also possible for higher clearing points (for example above 110°) to be achieved at a higher threshold voltage or lower clearing points to be achieved at lower threshold voltages with retention of the other advantageous properties. At viscosities correspondingly increased only slightly, it is likewise possible to obtain mixtures having greater $\Delta\epsilon$ and thus lower thresholds. The MLC displays according to the invention preferably operate at the first Gooch and Tarry transmission minimum [C. H. Gooch and H. A. Tarry, Electron. Lett. 10, 2-4, 1974; C. H. Gooch and H. A. Tarry, Appl. Phys., Vol. 8, 1575-1584, 1975] are used, where, besides particularly favourable electro-optical properties, such as, for example, high steepness of the characteristic line and low angle dependence of the contrast (German Patent 30 22 818), a lower dielectric anisotropy is sufficient at the same threshold voltage as in an analogous display at the second minimum. This enables significantly higher specific resistances to be achieved using the mixtures according to the invention at the first minimum than in the case of mixtures comprising cyano compounds. Through a suitable choice of the individual components and their proportions by weight, the person skilled in the art is able to set the birefringence necessary for a pre-specified layer thickness of the MLC display using simple routine methods.

The flow viscosity $v_{20}$ at 20° C. is preferably <60 mm$^2$·s$^{-1}$, particularly preferably <50 mm$^2$·s$^{-1}$. The rotational viscosity $\gamma_1$ of the mixtures according to the invention at 20° C. is preferably <120 mPa·s, particularly preferably <100 mPa·s. The nematic phase range is preferably at least 90°, particularly preferably at least 100°. This range preferably extends at least from −20° to +80°.

Measurements of the capacity holding ratio (HR) [S. Matsumoto et al., Liquid Crystals 5, 1320 (1989); K. Niwa et al., Proc. SID Conference, San Francisco, June 1984, p. 304 (1984); G. Weber et al., Liquid Crystals 5, 1381 (1989)] have shown that mixtures according to the invention comprising compounds of the formula I exhibit a significantly smaller decrease in the HR with increasing temperature than, for example, analogous mixtures comprising cyanophenylcyclohexanes of the formula

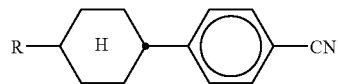

or esters of the formula

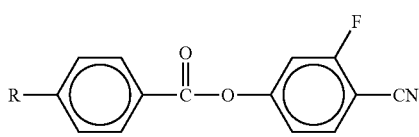

instead of the compounds of the formula I according to the invention.

The UV stability of the mixtures according to the invention is also considerably better, i.e. they exhibit a significantly smaller decrease in the HR on exposure to UV.

The media according to the invention do preferably contain only low amounts (≦10 wt. %) of compounds comprising a cyano group, very preferably no such compounds. The values of the Holding Ratio of the media according to the present invention are preferably >98%, very preferably >99% at 20° C.

In liquid crystal display devices short switching times are especially preferred, in particular when used in video and TV applications. For these applications switching times ($t_{on}+t_{off}$) below 25 ms are needed. The upper limit of the switching time is determined by the repeating rate of the picture.

In addition to the compounds of formula I, the medium according to the invention preferably contains one or more alkenyl compounds of formula II,

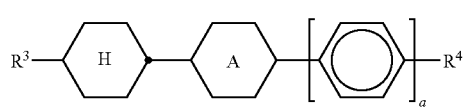

wherein

A is 1,4-phenylene or trans-1,4-cyclohexylene, a is 0 or 1, $R^3$ is an alkenyl group having from 2 to 9 carbon atoms, and $R^4$ is an alkyl group having from 1 to 12 carbon atoms which is unsubstituted, monosubstituted by CN or CF$_3$ or at least mono-substituted by halogen, wherein one or more CH$_2$ groups are optionally, in each case independently of one another, replaced by —O—, —S—,

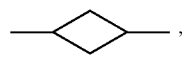

—CH=CH—, —C≡C—, —CO—, —CF$_2$O—, —OCF$_2$—, —CO—O—, —O—CO— or —O—CO—O— in such a way that O atoms are not linked directly to one another.

In the case a is 0 and A is cyclohexylene, $R^4$ is preferably alkyl with 1-8 C atoms or alkenyl with 2-9 C atoms.

Preferred compounds of the formula II are selected of the following formulae:

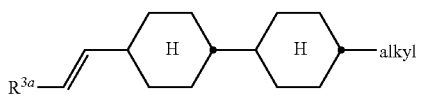

IIa

IIb

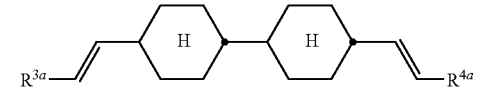

IIc

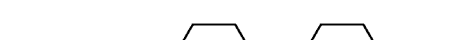

IId

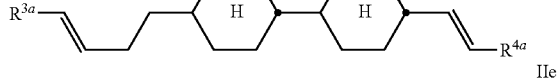

IIe

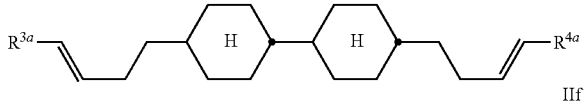

IIf

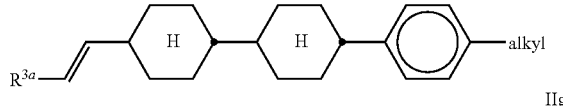

IIg

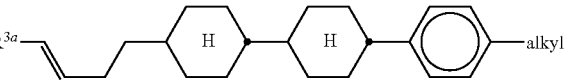

-continued

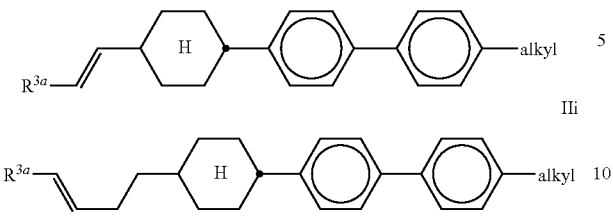

wherein
$R^{3a}$ and $R^{4a}$ are independently of each other H, $CH_3$, $C_2H_5$ or n-$C_3H_7$ and "alkyl" is a straight-chain alkyl group having from 1 to 8 carbon atoms.

Especially preferred are compounds of formulae IIa and IIf, in particular wherein $R^{3a}$ is H or $CH_3$, and compounds of formula IIc, in particular wherein $R^{3a}$ and $R^{4a}$ are H, $CH_3$ or $C_2H_5$.

Further preferred embodiments of the present invention are indicated below:
The medium additionally contains one or more compounds selected from the group containing of the general formulae III to VII

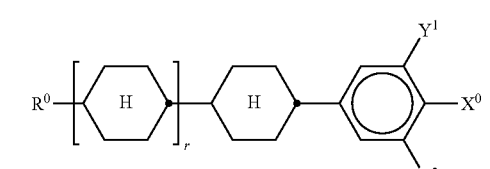 III

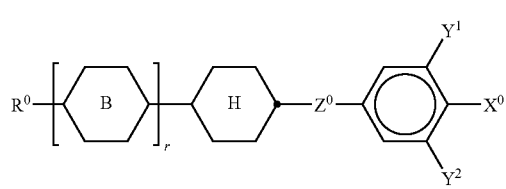 IV

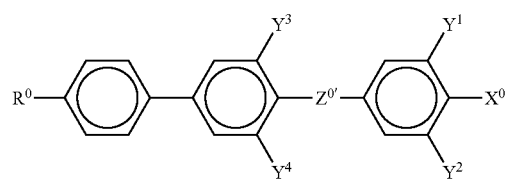 V

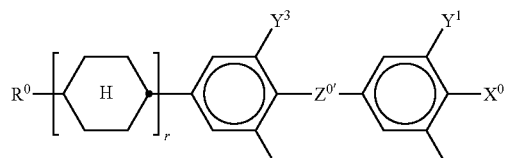 VI

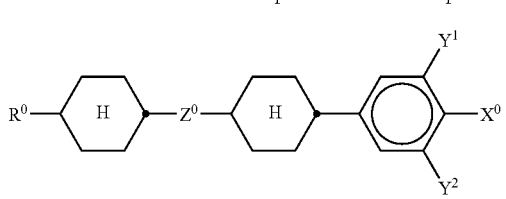 VII wherein the individual radicals have the following meanings:
$R^0$ is n-alkyl, alkoxy, oxaalkyl, fluoroalkyl or alkenyl, each having up to 9 carbon atoms, $X^0$ is F, Cl, halogenated alkyl, halogenated alkenyl, halogenated alkenyloxy or halogenated alkoxy having from 1 to 6 carbon atoms, $Z^0$ is —$C_2H_4$—, —$(CH_2)_4$—, —CH=CH—, —CF=CF—, —$C_2F_4$—, —$CH_2CF_2$—, —$CF_2CH_2$—, —$CH_2O$—, —$OCH_2$—, —COO—, —$OCF_2$— or —$CF_2O$—, $Z^{0'}$ is —$C_2H_4$—, —$(CH_2)_4$—, —CH=CH—, —CF=CF—, —$C_2F_4$—, —$CH_2CF_2$—, —$CF_2CH_2$—, —$CH_2O$—, —$OCH_2$—, —COO—, —$OCF_2$— or —$CF_2O$— or single bond, $Y^1$ to $Y^4$ are independently of one another H or F, r is 0 or 1,

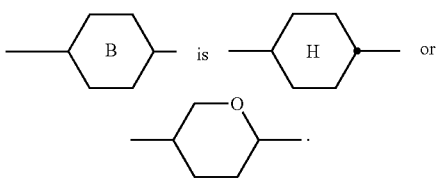

$X^0$ in the above formulae is preferably F, Cl, $CF_3$, $CHF_2$, $OCF_3$, $OCHF_2$, $OCFHCF_3$, $OCFHCHF_2$, $OCFHCHF_2$, $OCF_2CH_3$, $OCF_2CHF_2$, $OCF_2CHF_2$, $OCF_2CF_2CHF_2$, $OCF_2CF_2CHF_2$, $OCFHCF_2CF_3$, $OCFHCF_2CHF_2$, $OCF_2CF_2CF_3$, $OCF_2CF_2CClF_2$, $OCClFCF_2CF_3$ or CH=$CF_2$, most preferably F, Cl or $OCF_3$.

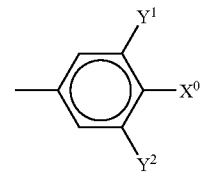

is preferably

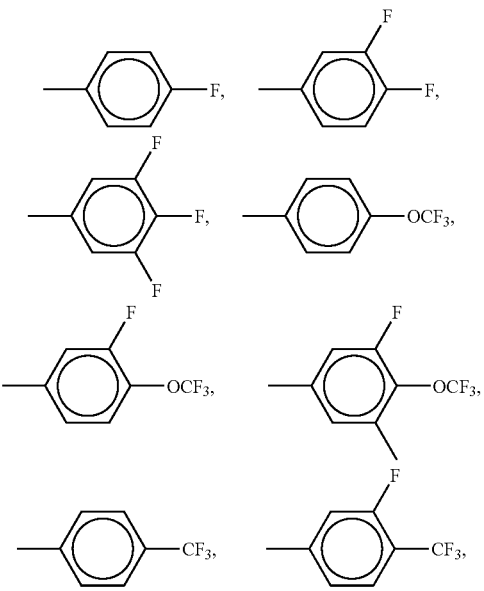

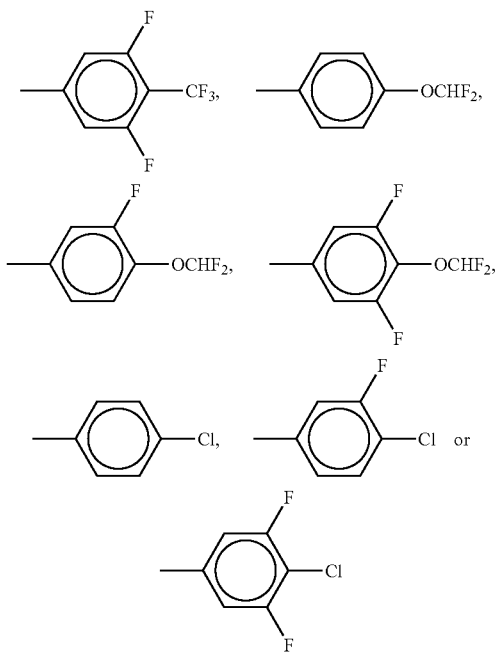

The compounds of formula III are preferably selected of the following formulae,

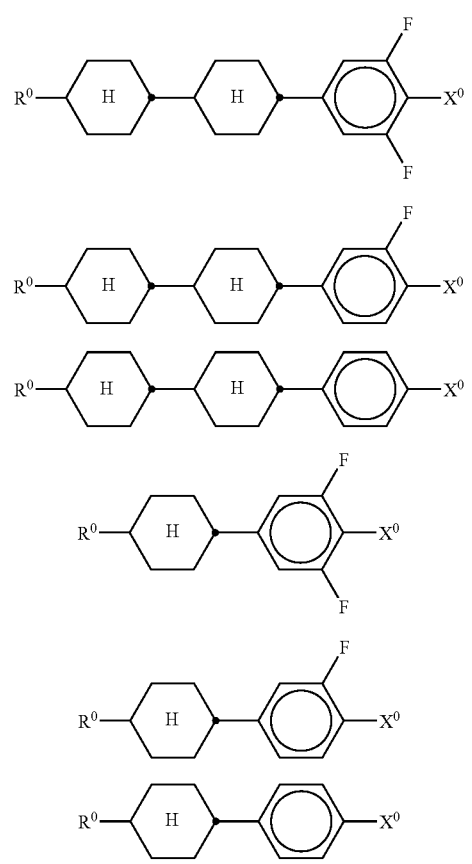

wherein $X^0$ and $R^0$ have the meaning given above and $X^0$ is preferably F, Cl or $OCF_3$.

The compounds of formula IV are preferably selected of the following formulae,

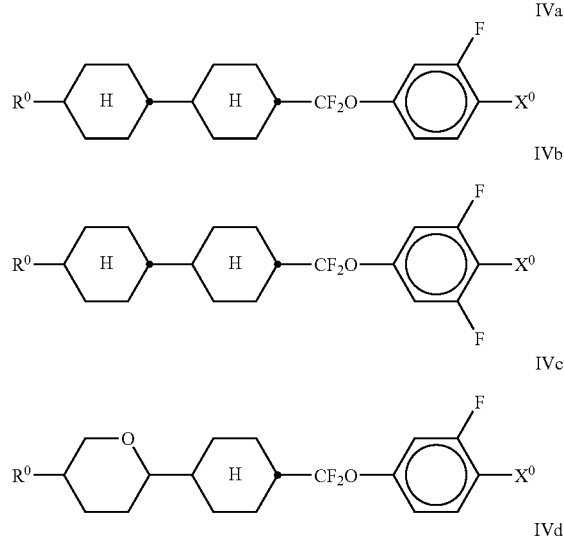

wherein $X^0$, $Y^2$ and $R^0$ have the meaning given above and $X^0$ is preferably F or $OCF_3$. Especially preferred are compounds of formula IVa, IVb, IVd and IVe.

The compounds of formula V are preferably selected of the following formulae

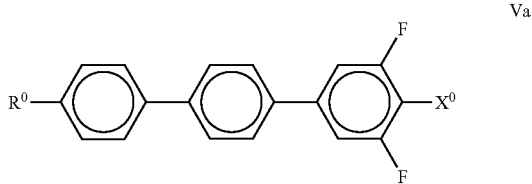

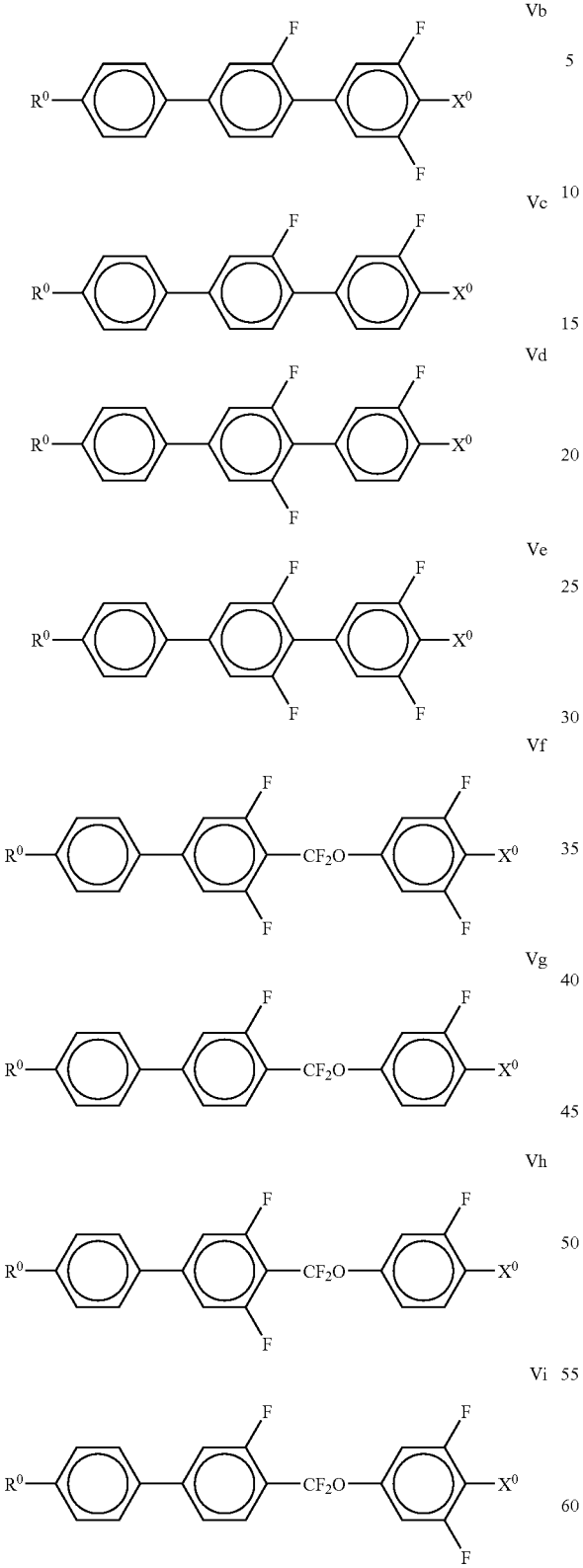

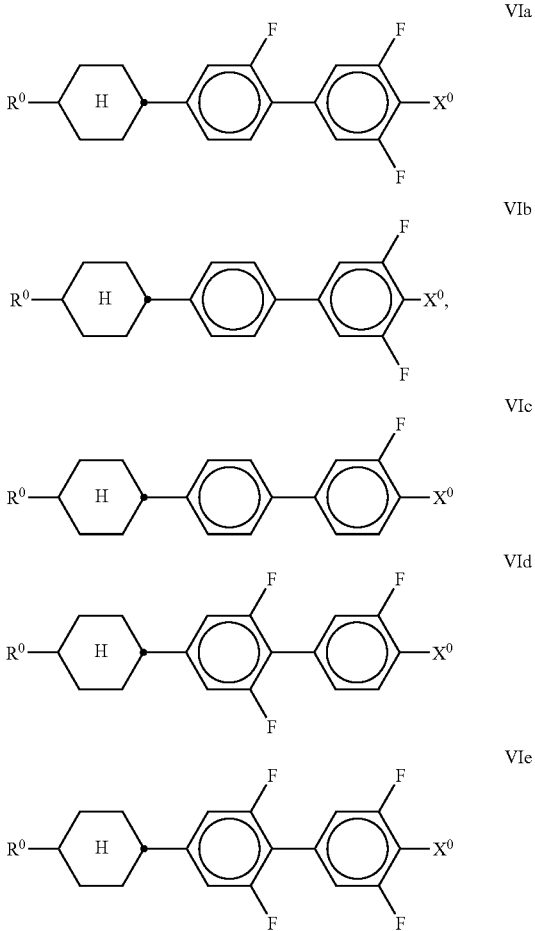

wherein $X^0$ and $R^0$ have the meaning given in formula III and $X^0$ is preferably F or $OCF_3$. Especially preferred are compounds of formula Vb and Vf.

The compounds of formula VI are preferably selected of the following formulae, wherein $X^0$ and $R^0$ have the meaning given above and $X^0$ is preferably F or $OCF_3$. Especially preferred are compounds of formula VIa, VIb and VIc.

The compounds of formula VII are preferably selected of the formulae VIIa and VIIb,

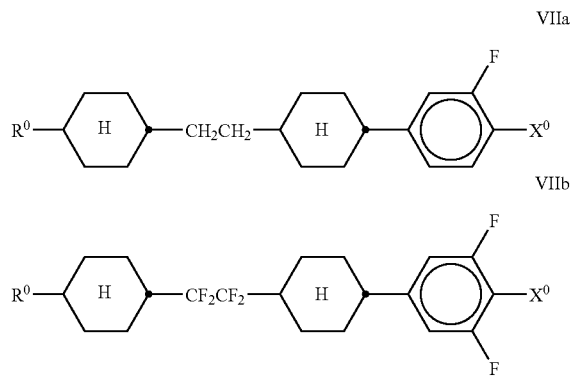

wherein $X^0$ and $R^0$ have the meaning given above and $X^0$ is preferably F or $OCF_3$.

The LC medium additionally contains one or more compounds of the following formulae

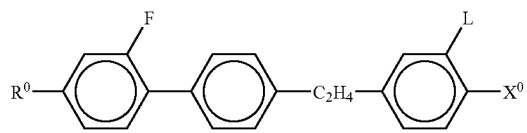

VIII

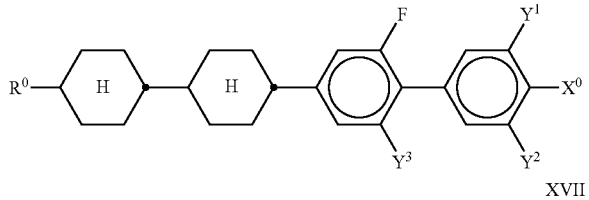

XVI

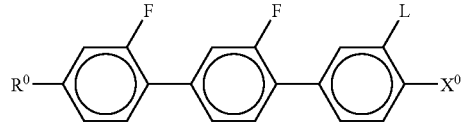

IX

XVII

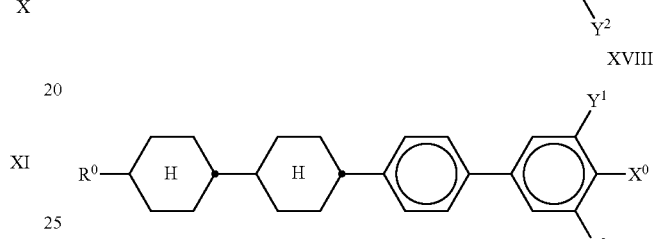

X

XVIII

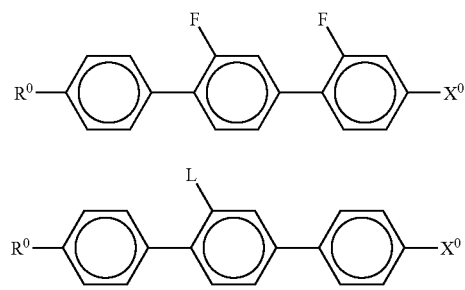

XI

XII

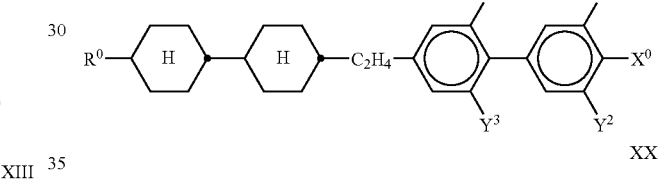

XIX wherein $X^0$ and $R^0$ have the meaning given above, and L is H, F or Cl. $X^0$ is preferably F or Cl. In the compounds of formula VIII, IX and X, preferably $X^0$ is Cl or F and L is H or F. Very preferred are compounds of formulae VIII, IX and X.

The medium additionally contains one or more compounds selected of the following formulae

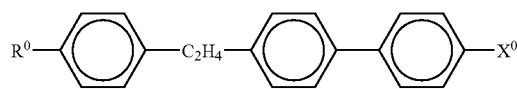

XIII

XX

XIV

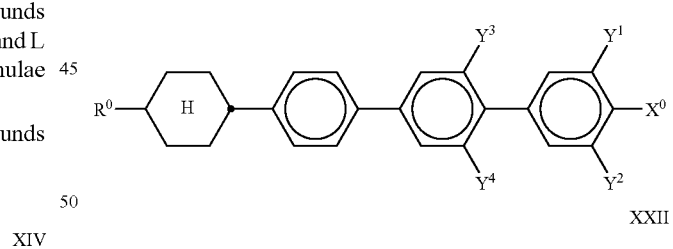

XXI

XXII

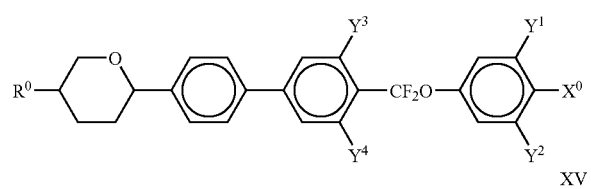

XIV

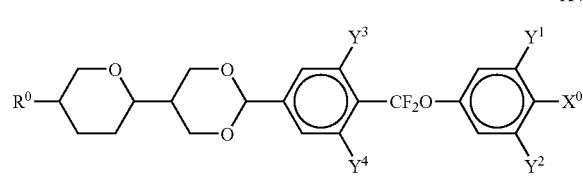

XV

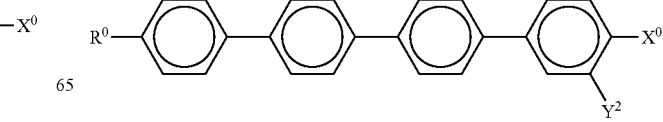

XXIII

-continued

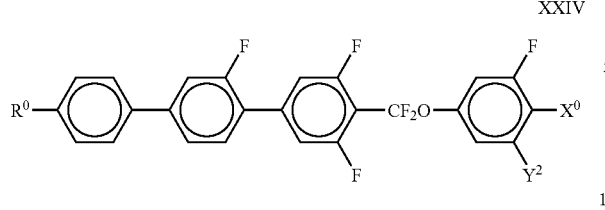
XXIV in which $R^0$, $X^0$ and $Y^{1-4}$ are each, independently of one another, as defined in formulae III-VII. $X^0$ is preferably F, Cl, $CF_3$, $OCF_3$ or $OCHF_2$. $R^0$ is preferably alkyl, oxaalkyl, fluoroalkyl or alkenyl, each having up to 6 carbon atoms. Especially preferred are compounds of formula XIV, XXIII and XXIV, in particular wherein $Y^{1-4}$ are F, and compounds of formula XVI, in particular wherein $Y^{1-2}$ are F and $Y^3$ is H.

The medium additionally contains one or more compounds of the following formulae,

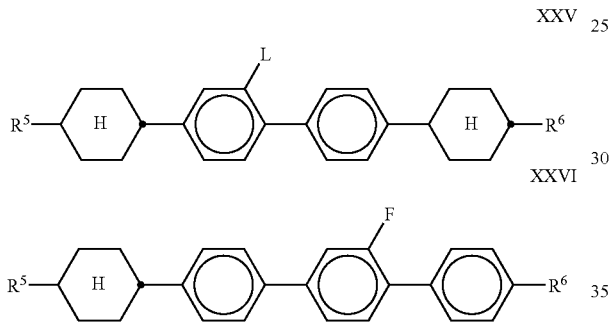
XXV

XXVI in which $R^5$ and $R^6$ have independently of each other one of the meanings of $R^4$ as defined in formula II, and L is H or F. Especially preferred are compounds of formula XXV in which L is F.

The medium additionally contains one or more alkenyl compounds of the following formula

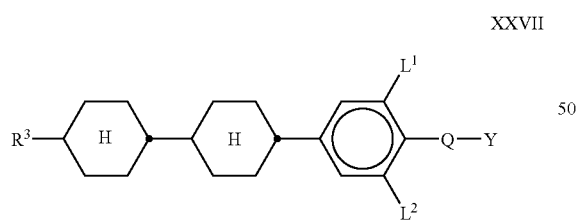
XXVII wherein $R^3$ is as defined in formula II,

Q is $CF_2$, $OCF_2$, CFH, OCFH or a single bond,

Y is F or Cl, and $L^1$ and $L^2$ are independently of each other H or F.

Especially preferred are compounds of formula XXVII wherein $L^1$ and/or $L^2$ are F and Q-Y is F or $OCF_3$. Further preferred are compounds of formula XXVII wherein $R^3$ is Vinyl, 1E-alkenyl or 3E-alkenyl having 2 to 7, preferably 2, 3 or 4 carbon atoms.

Very preferred are compounds of formula XXVIIa

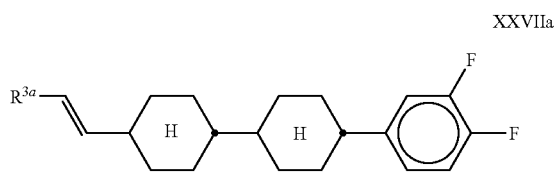
XXVIIa wherein $R^{3a}$ is H, $CH_3$, $C_2H_5$ or n-$C_3H_7$, in particular H or $CH_3$.

The medium additionally contains one or more alkenyl compounds of the following formula,

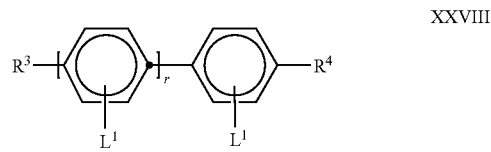
XXVIII wherein $R^3$ and $R^4$ are as defined in formula II and r is 1 or 2. $L^1$ and $L^2$ are each independently H or F.

Preferred compounds of the formula XXVIII are

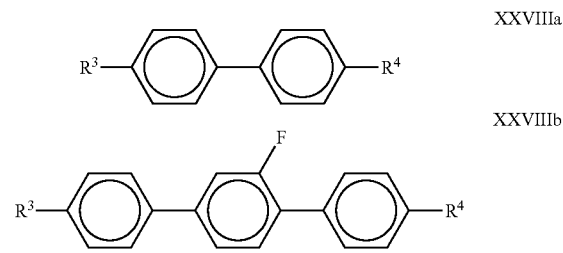
XXVIIIa

XXVIIIb

Especially preferred are compounds of formula XXVIII wherein $R^1$ and $R^2$ are 1E-alkenyl or 3E-alkenyl having 2 to 7, preferably 2, 3 or 4 carbon atoms. Very preferred are compounds of formula XXVIIIa

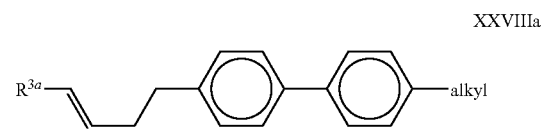
XXVIIIa wherein $R^{3a}$ and "alkyl" are as defined in formula IIa, and $R^{3a}$ preferably denotes H or $CH_3$.

The medium additionally contains one or more compounds selected of the following formulae,

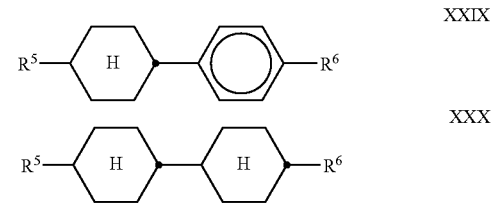
XXIX

XXX

-continued

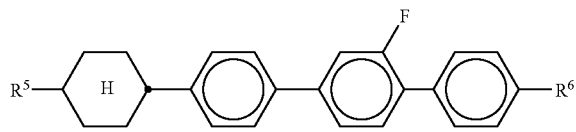
XXXI in which $R^5$ and $R^6$ are as defined above.

The medium additionally contains one or more compounds selected of the formulae D1 and D2

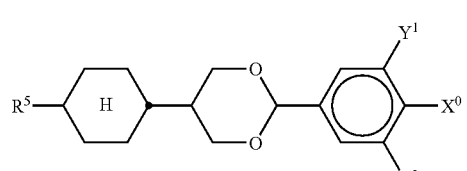
D1

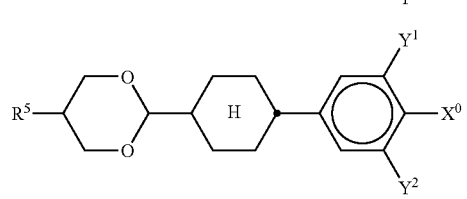
D2 wherein $Y^1$, $Y^2$, $X^0$ and $R^5$ are as defined in claim 3 or claim 7 and $Y^1$ and $Y^2$ are H or F, preferably $Y^1=Y^2=F$ and $X^0$ is preferably F.

The medium additionally contains one or more compounds selected of the formulae Q1 and Q2

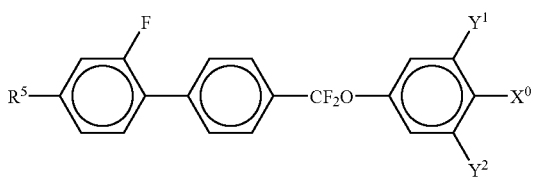
Q1

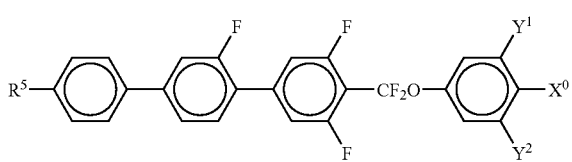
Q2 wherein $Y^1$, $X^0$, $Y^2$ and $R^5$ are as defined in claim 3 or claim 7. $Y^1$ and $Y^2$ are H or F, preferably $Y^1=Y^2=F$ and $X^0$ is preferably F.

The medium contains one or more compounds selected from the formulae II, III, IV, V, VI, VII, IX, X, XIV, XVI, XXIV, XXV, XXVI and XXVII;

$R^0$ is straight-chain alkyl or alkenyl having from 2 to 7 carbon atoms;

The medium contains from 1 to 4, preferably 1 or 2 compounds of formula I, most preferably of formula I1;

The medium contains from 1 to 6, preferably 1, 2, 3 or 4 compounds of formula II, most preferably of formula II and/or IIc;

The proportion of compounds of the formula I in the medium is 1-15%, very preferably 1-8% by weight based on the total mixture;

The proportion of compounds of the formula II in the medium is 20-70%, very preferably 30-60% by weight based on the total mixture;

The medium contains 15 to 50%, preferably 20 to 40% by weight of one or more compounds of formula IIa, in particular wherein $R^{3a}$ is H based on the total mixture;

The proportion of compounds of the formula III in the medium is 5-40%, very preferably 10-25% by weight based on the total mixture;

The proportion of compounds of the formula IV in the medium is 5-35%, very preferably 10-25% by weight based on the total mixture;

The proportion of compounds of the formula V in the medium is 4-35%, very preferably 5-25% by weight based on the total mixture;

The proportion of compounds of the formula VI in the medium is 5-30%, very preferably 5-25% by weight based on the total mixture;

The proportion of compounds of the formula IX in the medium is 2-20%, very preferably 2-10% by weight based on the total mixture;

The proportion of compounds of the formula XIV in the medium is 1-10%, very preferably 1-8% by weight based on the total mixture;

The proportion of compounds of the formula XXV in the medium is 2-20%, very preferably 1-15% by weight based on the total mixture;

The proportion of compounds of the formula XXVII in the medium is 2-30%, very preferably 5-25% by weight based on the total mixture;

The medium essentially consists of compounds selected from the group consisting of the general formulae I, II and III to XXXI.

The term "alkyl" covers straight-chain and branched alkyl groups having 1-7 carbon atoms, in particular the straight-chain groups methyl, ethyl, propyl, butyl, pentyl, hexyl and heptyl. Groups having 2-5 carbon atoms are generally preferred.

The term "alkenyl" covers straight-chain and branched alkenyl groups having 2-7 carbon atoms, in particular the straight-chain groups. Particular alkenyl groups are $C_2$-$C_7$-1E-alkenyl, $C_4$-$C_7$-3E-alkenyl, $C_5$-$C_7$-4-alkenyl, $C_6$-$C_7$-5-alkenyl and $C_7$-6-alkenyl, in particular $C_2$-$C_7$-1E-alkenyl, $C_4$-$C_7$-3E-alkenyl and $C_5$-$C_7$-4-alkenyl. Examples of preferred alkenyl groups are vinyl, 1E-propenyl, 1E-butenyl, 1E-pentenyl, 1E-hexenyl, 1E-heptenyl, 3-butenyl, 3E-pentenyl, 3E-hexenyl, 3E-heptenyl, 4-pentenyl, 4Z-hexenyl, 4E-hexenyl, 4Z-heptenyl, 5-hexenyl, 6-heptenyl and the like. Groups having up to 5 carbon atoms are generally preferred.

The term "fluoroalkyl" preferably covers straight-chain groups having a terminal fluorine, i.e. fluoromethyl, 2-fluoroethyl, 3-fluoropropyl, 4-fluoro-butyl, 5-fluoropentyl, 6-fluorohexyl and 7-fluoroheptyl. However, other positions of the fluorine are not excluded.

The term "oxaalkyl" preferably covers straight-chain radicals of the formula $C_nH_{2n+1}$—O—$(CH_2)_m$, in which n and m are each, independently of one another, from 1 to 6. n is preferably =1 and m is preferably from 1 to 6.

It has been found that even a relatively small proportion of compounds of the formula I mixed with conventional liquid-crystal materials, but in particular with one or more compounds of the formulae II, III, IV, V, VI and/or VII, results in a significant lowering of the threshold voltage and in low birefringence values, with broad nematic phases with low smectic-nematic transition temperatures being observed at the same time, improving the shelf life. The compounds of the formulae I-XVIII are colourless, stable and readily miscible with one another and with other liquid-crystalline materials. Furthermore, the mixtures according to the invention are distinguished by high clearing points and at the same time very low values for the rotational viscosity $\gamma_1$.

Through a suitable choice of the meanings of $R^0$ and $X^0$, the addressing times, the threshold voltage, the steepness of the transmission characteristic lines, etc., can be modified in the desired manner. For example, 1E-alkenyl radicals, 3E-alkenyl radicals, 2E-alkenyloxy radicals and the like generally result in shorter addressing times, improved nematic tendencies and a higher ratio of the elastic constants $k_{33}$ (bend) and $k_{11}$ (splay) compared with alkyl or alkoxy radicals. 4-alkenyl radicals, 3-alkenyl radicals and the like generally give lower threshold voltages and smaller values of $k_{33}/k_{11}$ compared with alkyl and alkoxy radicals.

A —CH$_2$CH$_2$— group generally results in higher values of $k_{33}/k_{11}$ compared with a single covalent bond. Higher values of $k_{33}/k_{11}$ facilitate, for example, flatter transmission characteristic lines in TN cells with a 90°twist (in order to achieve grey shades) and steeper transmission characteristic lines in STN, SBE and OMI cells (greater multiplexability), and vice versa.

The optimum mixing ratio of the compounds of the formulae I-XXXI depends substantially on the desired properties, on the choice of the components of the formulae I-XXXI, and the choice of any other components that may be present. Suitable mixing ratios within the range given above can easily be determined from case to case.

The total amount of compounds of the formulae I-XXXI in the mixtures according to the invention is not crucial. The mixtures can therefore comprise one or more further components for the purposes of optimising various properties. However, the observed effect on the addressing times and the threshold voltage is generally greater, the higher the total concentration of compounds of the formulae I-XXXI.

In a particularly preferred embodiment, the media according to the invention comprise compounds of the formulae III to VII in which $X^0$ is F, OCF$_3$, OCHF$_2$, OCH=CF$_2$, OCF=CF$_2$ or OCF$_2$—CF$_2$H. A favourable synergistic effect with the compounds of the formula I results in particularly advantageous properties. In particular, mixtures comprising compounds of the formula I and of the formula III-VII, especially IV and VI, are distinguished by their low threshold voltages.

Liquid crystal media according to the present invention comprising compounds of formula I and further comprising one or more compounds of formulae II-XVIII are characterized by low values of the rotational viscosity, high birefringence, good LTS and show fast response times. They are particularly suitable for TV, video and monitor applications.

The individual compounds of the formulae I-XXXI and their sub-formulae, which can be used in the media according to the invention, are either known or they can be prepared analogously to the known compounds.

The construction of the MLC display according to the invention from polarisers, electrode base plates and surface-treated electrodes corresponds to the conventional construction for displays of this type. The term "conventional construction" is broadly drawn here and also covers all derivatives and modifications of the MLC display, in particular including matrix display elements based on poly-Si TFT or MIM.

A significant difference between the displays according to the invention and the conventional displays based on the twisted nematic cell consists, however, in the choice of the liquid-crystal parameters of the liquid-crystal layer.

The liquid-crystal mixtures, which can be used in accordance with the invention, are prepared in a manner conventional per se. In general, the desired amount of the components used in the lesser amount is dissolved in the components making up the principal constituent, advantageously at elevated temperature. It is also possible to mix solutions of the components in an organic solvent, for example in acetone, chloroform or methanol, and to remove the solvent again, for example by distillation, after thorough mixing.

The dielectrics may also comprise further additives known to the person skilled in the art and described in the literature. For example, 0-15% of pleochroic dyes, stabilizers, antioxidants, nanoparticles, microparticles or chiral dopants can be added. Suitable dopants and stabilizers are shown in tables C and D below.

In the present application and in the examples below, the structures of the liquid-crystal compounds are indicated by means of acronyms, the trans-formation into chemical formulae taking place in accordance with Tables A and B below. All radicals $C_nH_{2n+1}$ and $C_mH_{2m+1}$ are straight-chain alkyl radicals having n and m carbon atoms respectively; n and m are preferably 0, 1, 2, 3, 4, 5, 6 or 7. The coding in Table B is self-evident. In Table A, only the acronym for the parent structure is indicated. In individual cases, the acronym for the parent structure is followed, separated by a dash, by a code for the substituents $R^1$, $R^2$, $L^1$ and $L^2$.

| Code for $R^{1*}$, $R^{2*}$, $L^{1*}$, $L^{2*}$, $L^{3*}$ | $R^{1*}$ | $R^{2*}$ | $L^{1*}$ | $L^{2*}$ |
|---|---|---|---|---|
| nm | $C_nH_{2n+1}$ | $C_mH_{2m+1}$ | H | H |
| nOm | $OC_nH_{2n+1}$ | $C_mH_{2m+1}$ | H | H |
| nO•m | $C_nH_{2n+1}$ | $OC_mH_{2m+1}$ | H | H |
| n | $C_nH_{2n+1}$ | CN | H | H |
| nN•F | $C_nH_{2n+1}$ | CN | F | H |
| nN•F•F | $C_nH_{2n+1}$ | CN | F | F |
| nF | $C_nH_{2n+1}$ | F | H | H |
| nCl | $C_nH_{2n+1}$ | Cl | H | H |
| nOF | $OC_nH_{2n+1}$ | F | H | H |
| nF•F | $C_nH_{2n+1}$ | F | F | H |
| nF•F•F | $C_nH_{2n+1}$ | F | F | F |
| nmF | $C_nH_{2n+1}$ | $C_mH_{2m+1}$ | F | H |
| nOCF$_3$ | $C_nH_{2n+1}$ | OCF$_3$ | H | H |
| nOCF$_3$•F | $C_nH_{2n+1}$ | OCF$_3$ | F | H |
| n-Vm | $C_nH_{2n+1}$ | —CH=CH—$C_mH_{2m+1}$ | H | H |
| nV-Vm | $C_nH_{2n+1}$—CH=CH— | —CH=CH—$C_mH_{2m+1}$ | H | H |

Preferred mixture components of the mixture concept according to the invention are given in Tables A and B.
TABLE A
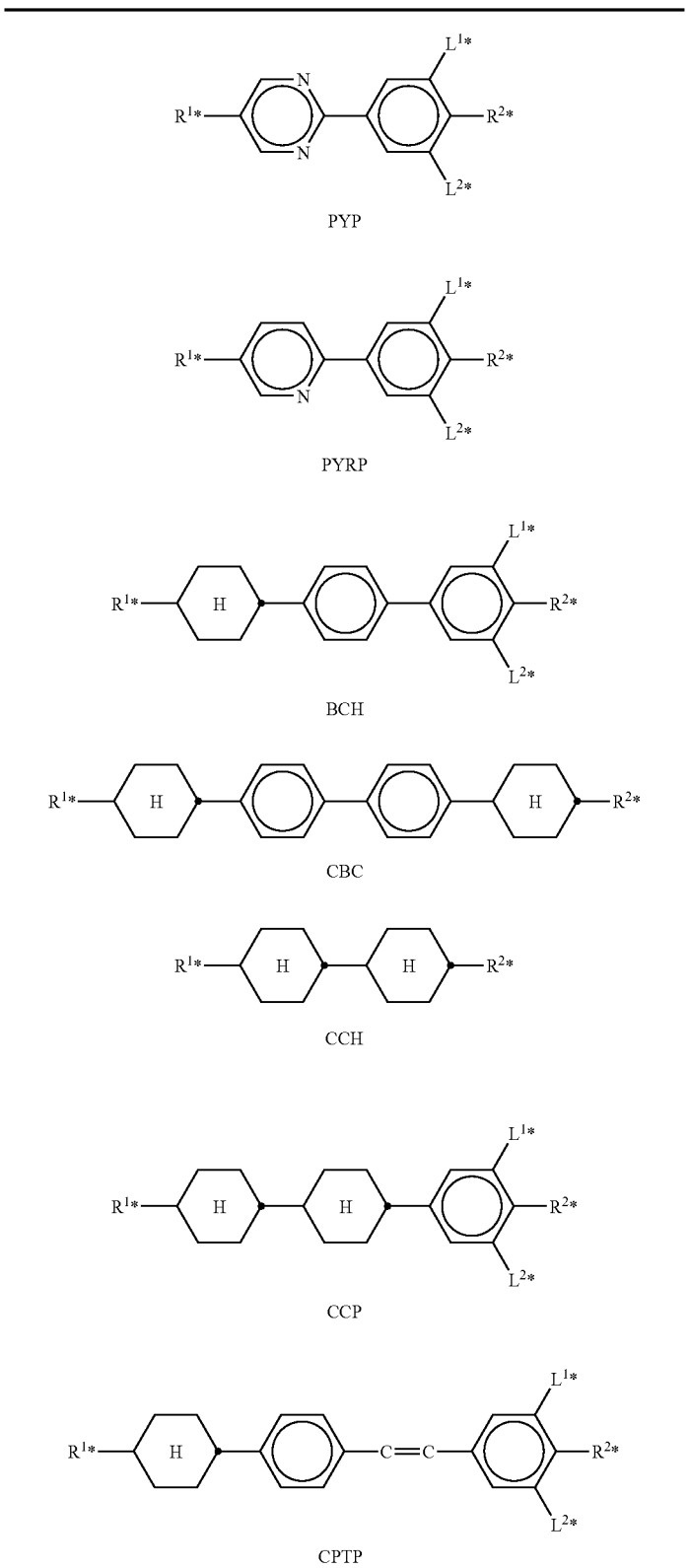

TABLE A-continued
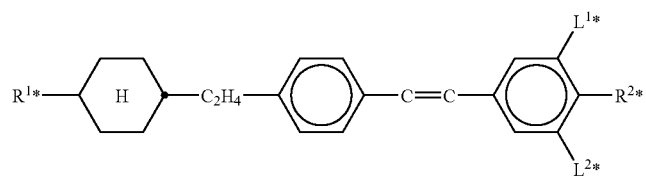
CEPTP
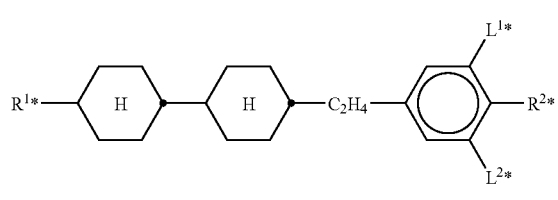
ECCP
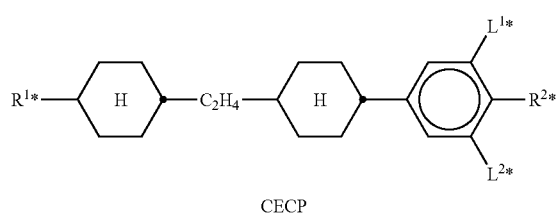
CECP
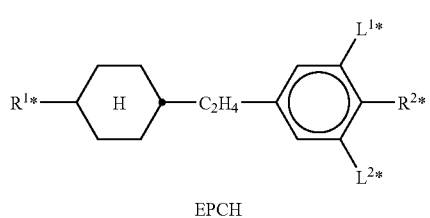
EPCH
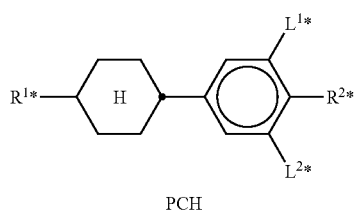
PCH
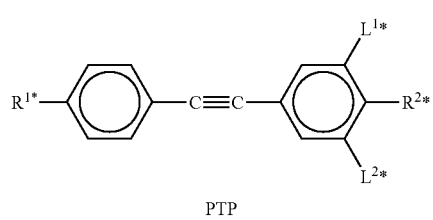
PTP
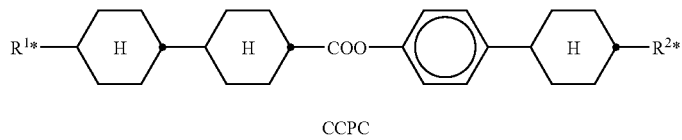
CCPC TABLE A-continued
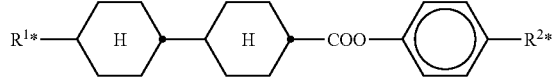
CP
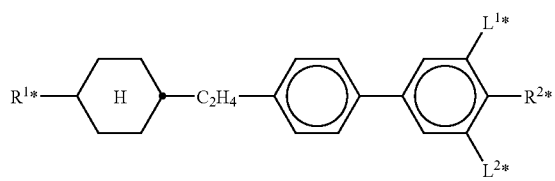
BECH
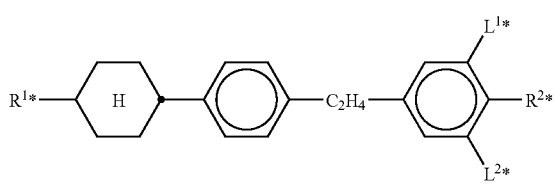
EBCH
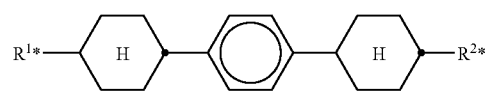
CPC
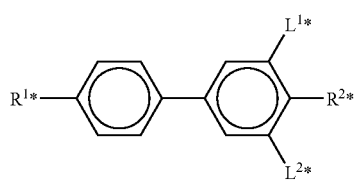
B
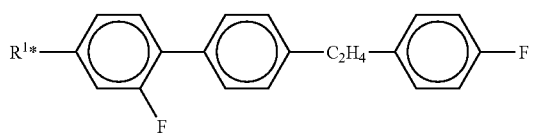
FET-nF
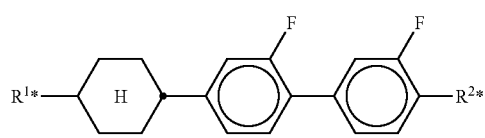
CGG
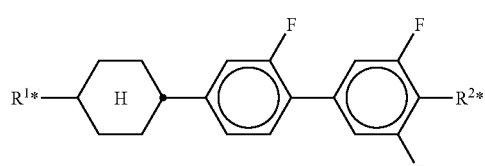
CGU TABLE A-continued
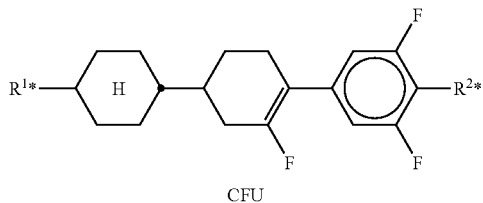
CFU
TABLE B
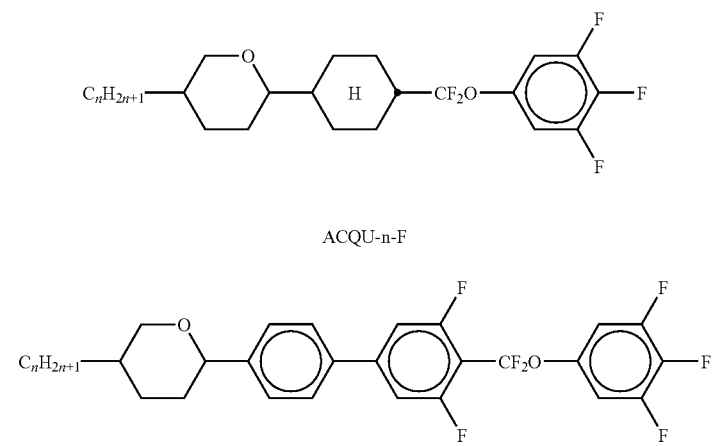
ACQU-n-F
APUQU-n-F
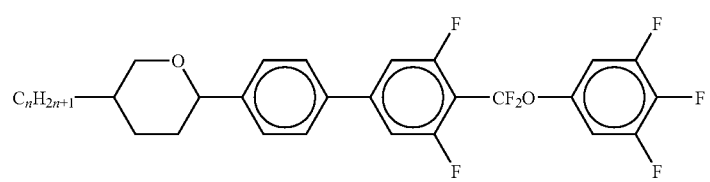
BCH-n.Fm
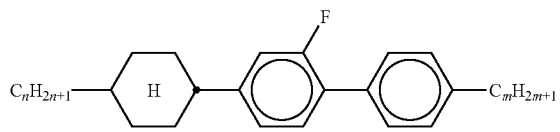
CFU-n-F
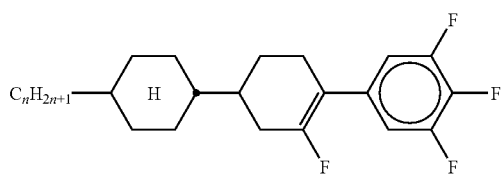
CBC-nmF
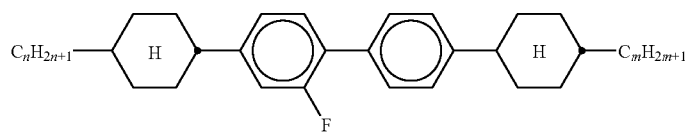
ECCP-nm
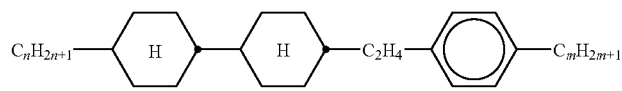

TABLE B-continued
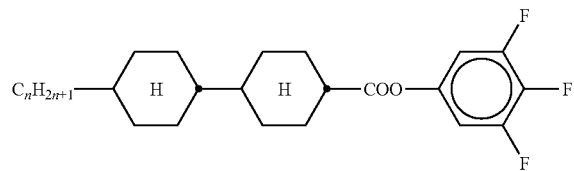
CCZU-n-F
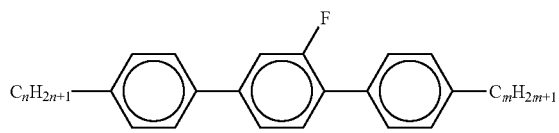
PGP-n-m
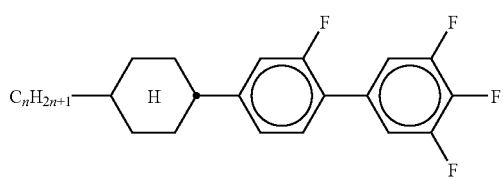
CGU-n-F
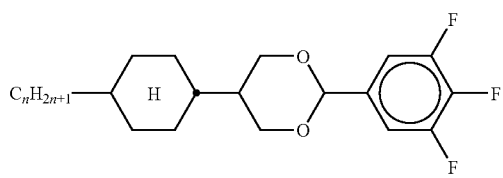
CDU-n-F
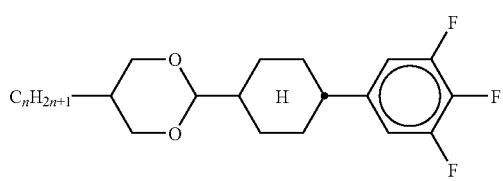
DCU-n-F
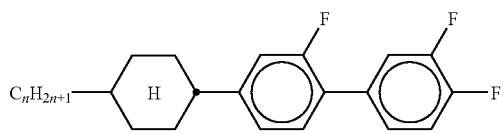
CGG-n-F
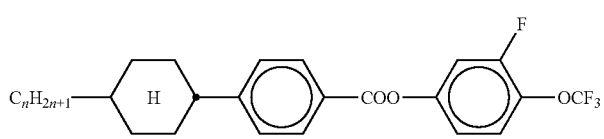
CPZG-n-OT
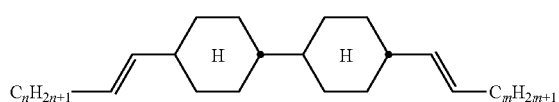
CC-nV-Vm TABLE B-continued
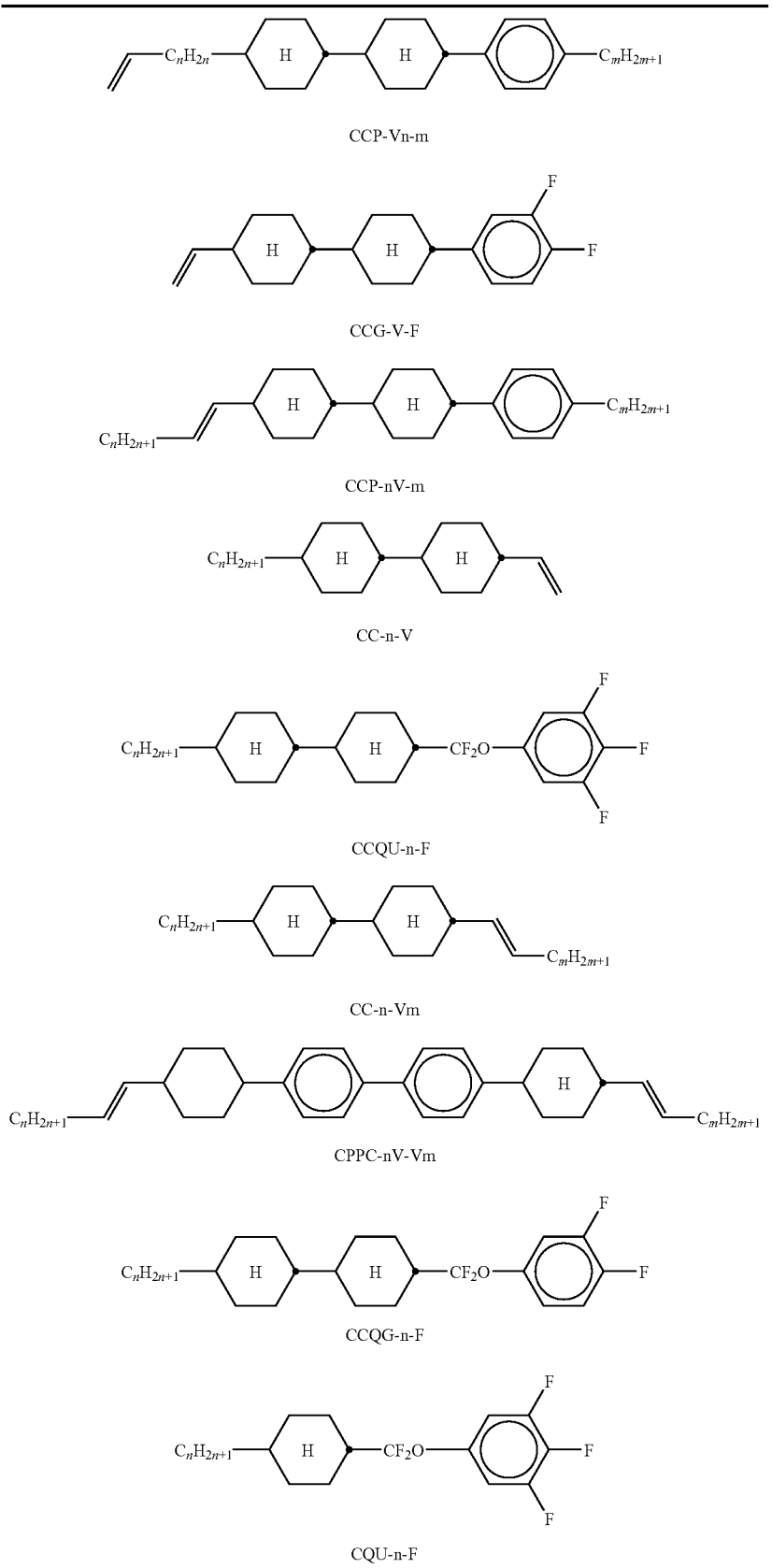

TABLE B-continued
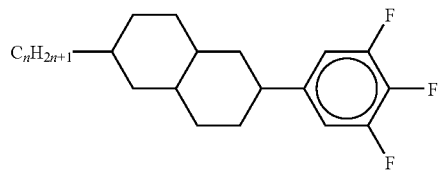
Dec-U-n-F
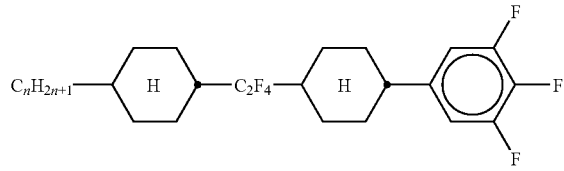
CWCU-n-F
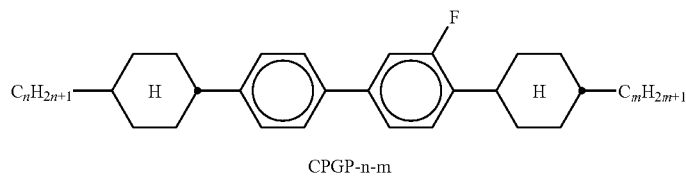
CPGP-n-m
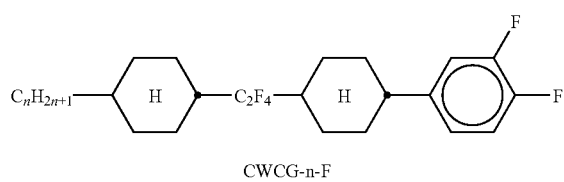
CWCG-n-F
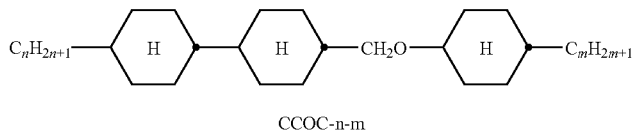
CCOC-n-m
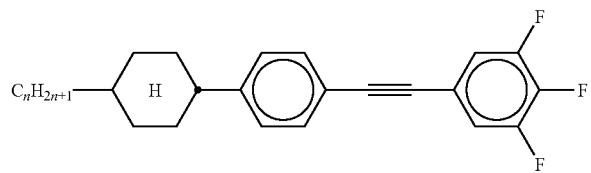
CPTU-n-F
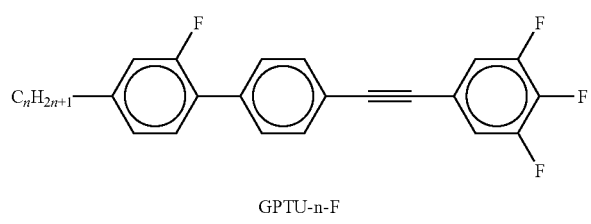
GPTU-n-F TABLE B-continued
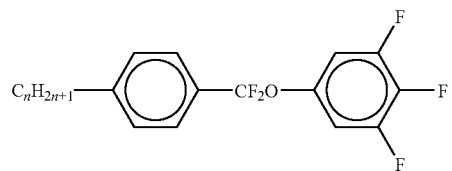
PQU-n-F
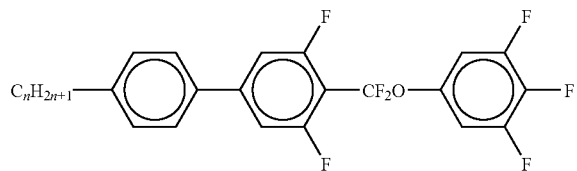
PUQU-n-F
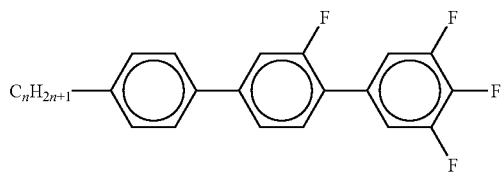
PGU-n-F
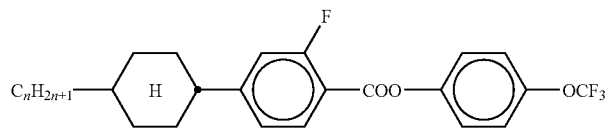
CGZP-n-OT
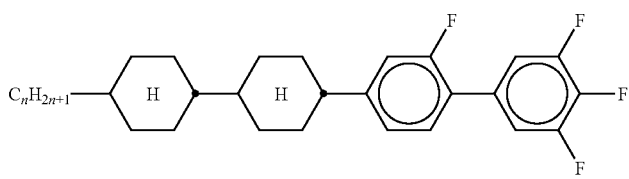
CCGU-n-F
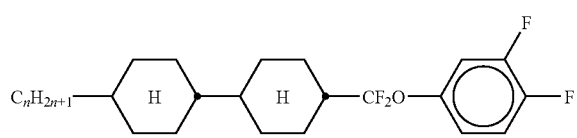
CCQG-n-F
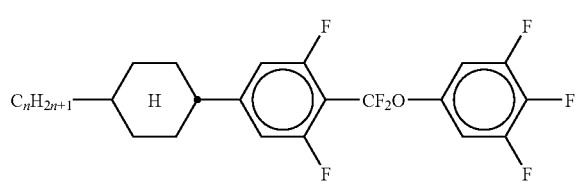
CUQU-n-F TABLE B-continued
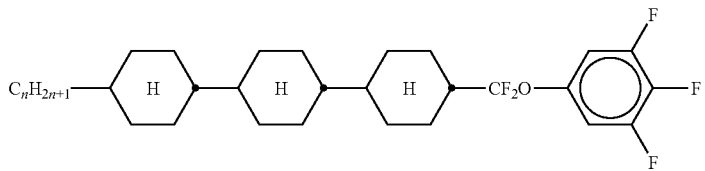
CCCQU-n-F
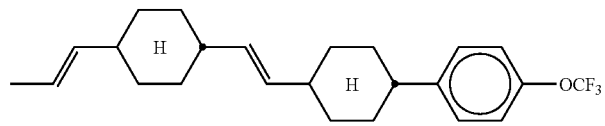
CVCP-1V-OT
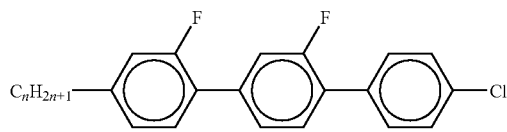
GGP-n-Cl
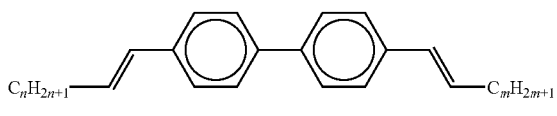
PP-nV-Vm
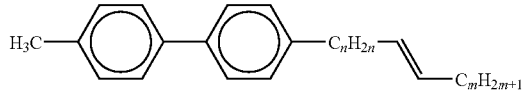
PP-1-nVm
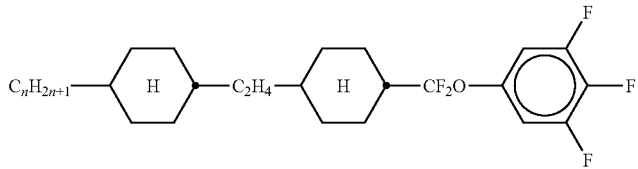
CWCQU-n-F
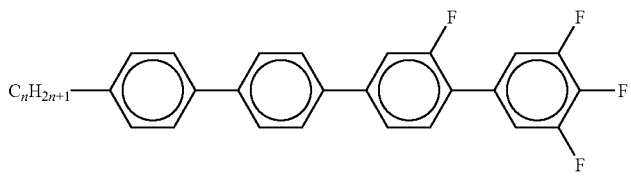
PPGU-n-F
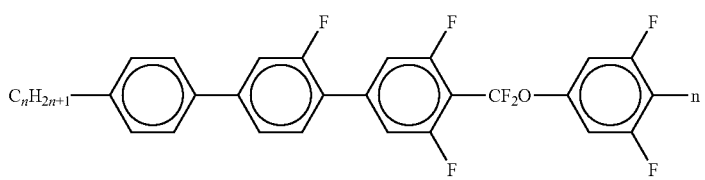
PGUQU-n-F

TABLE B-continued
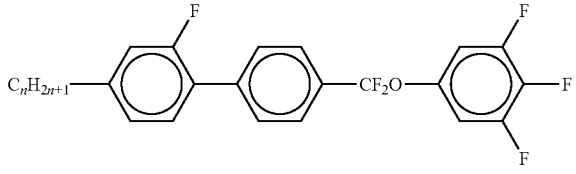
GPQU-n-F
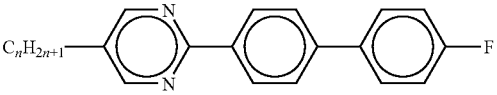
MPP-n-F
TABLE C
Table C shows possible dopants that are optionally added to the compounds according to the invention, preferably in proportions of from 0.1 to 10 wt.-%, very preferably from 0.1 to 6 wt.-%.
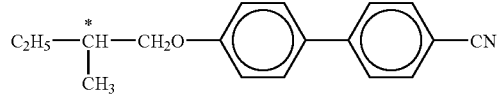
C 15
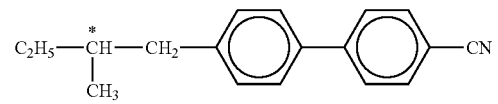
CB 15
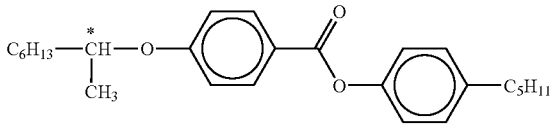
CM 21
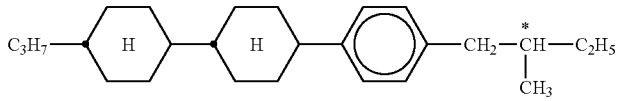
CM 44
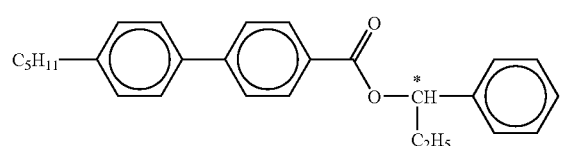
CM 45
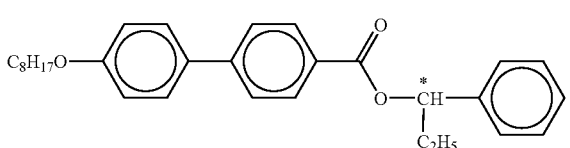
CM 47

TABLE C-continued
Table C shows possible dopants that are optionally added to the compounds
according to the invention, preferably in proportions of from
0.1 to 10 wt.- %, very preferably from 0.1 to 6 wt.- %.
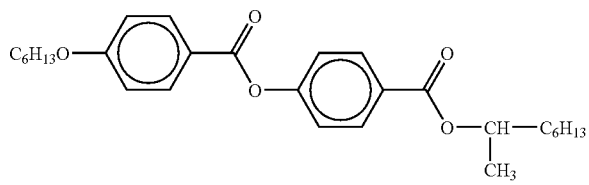
R/S-811
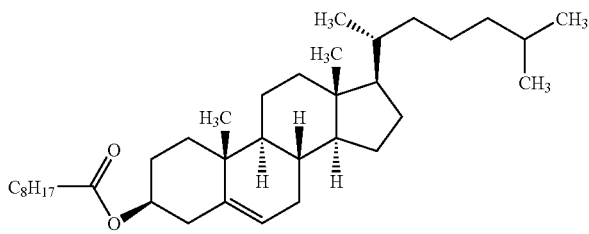
CN
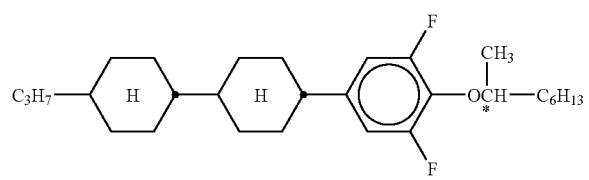
R/S-2011
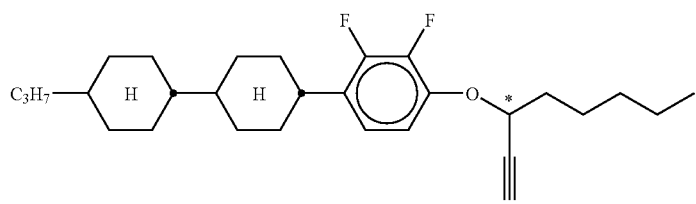
R/S-3011
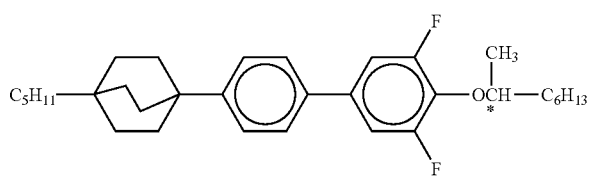
R/S-4011
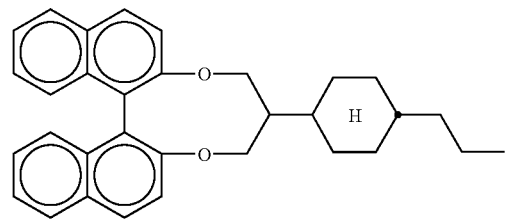
R/S-5011

TABLE C-continued

Table C shows possible dopants that are optionally added to the compounds according to the invention, preferably in proportions of from 0.1 to 10 wt.- %, very preferably from 0.1 to 6 wt.- %.

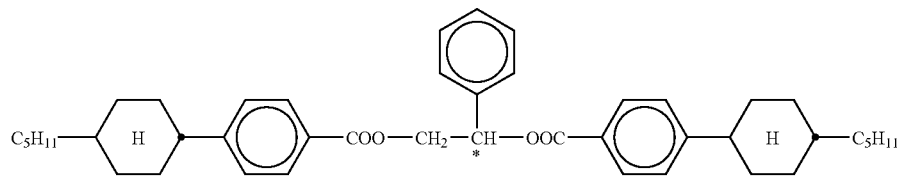

R/S-1011

TABLE D

Table D shows possible stabilisers that are optionally added to the mixtures according to the invention, preferably in amounts of 0.001 to 8 wt.- %, especially preferred in amounts of 0.05 to 5 wt.- % by weight based on the final mixture.

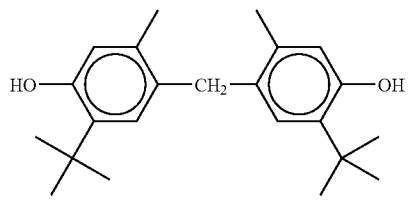

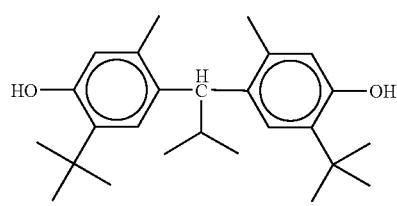

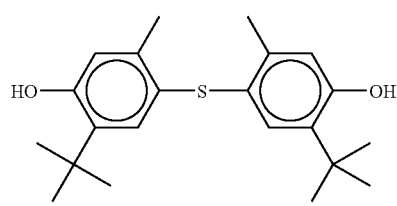

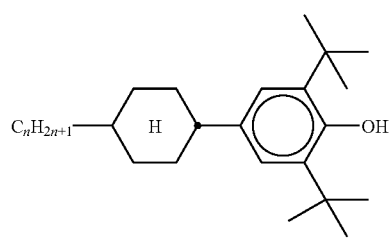

TABLE D-continued
Table D shows possible stabilisers that are optionally added to the mixtures according to the invention, preferably in amounts of 0.001 to 8 wt.-%, especially preferred in amounts of 0.05 to 5 wt.-% by weight based on the final mixture.
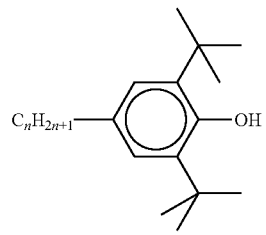
(n = 1, 2, 3, 4, 5, 7, 9)
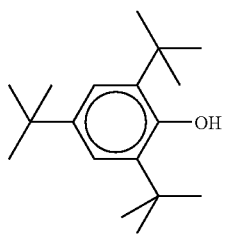
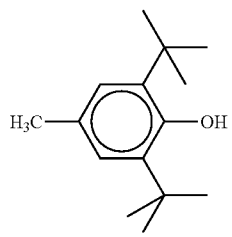
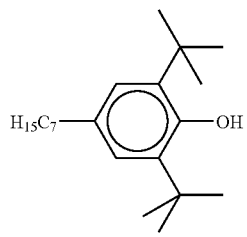
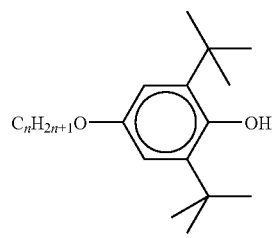
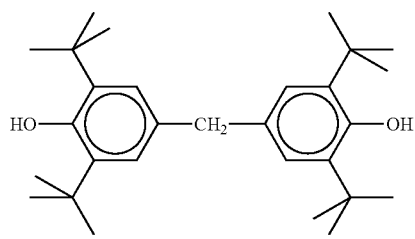

TABLE D-continued
Table D shows possible stabilisers that are optionally added to the mixtures according to the invention, preferably in amounts of 0.001 to 8 wt.- %, especially preferred in amounts of 0.05 to 5 wt.- % by weight based on the final mixture.
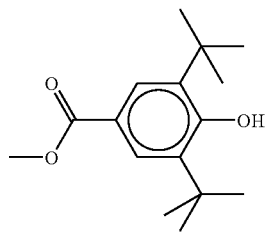
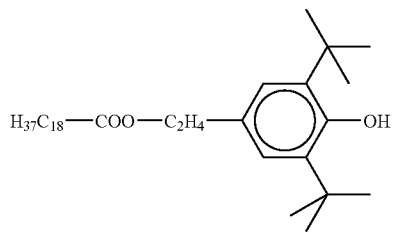
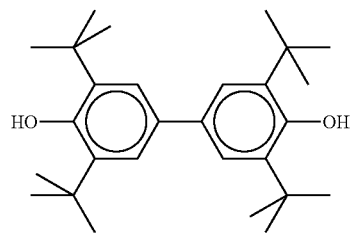
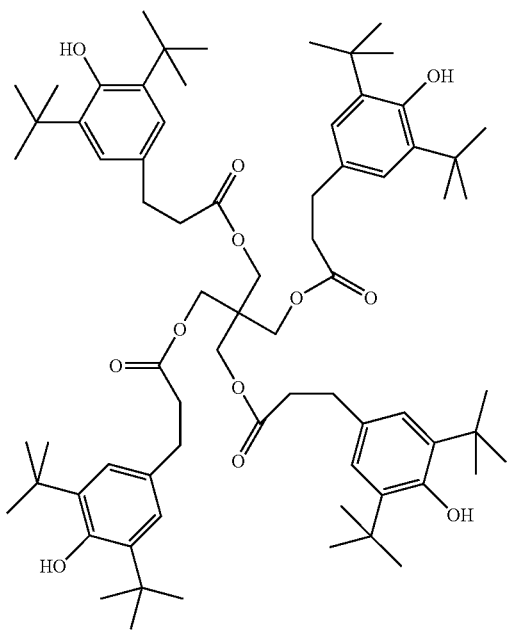

TABLE D-continued
Table D shows possible stabilisers that are optionally added to the mixtures according to the invention, preferably in amounts of 0.001 to 8 wt.-%, especially preferred in amounts of 0.05 to 5 wt.-% by weight based on the final mixture.
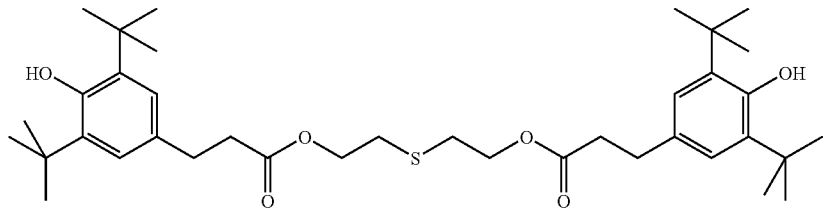
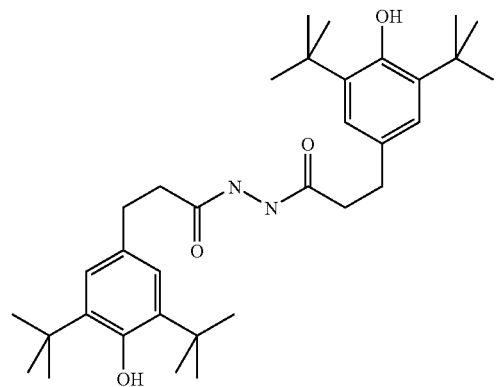
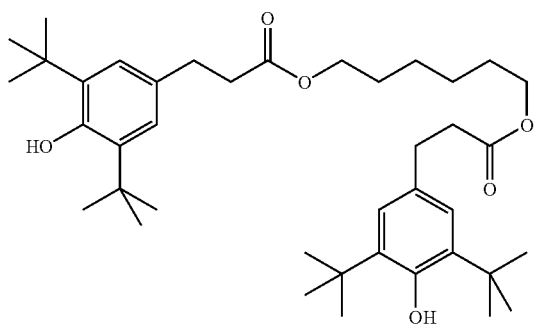
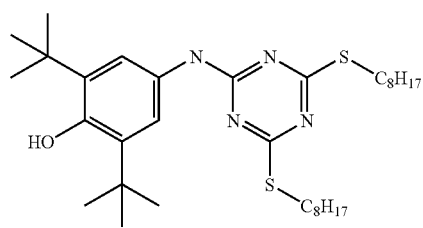

TABLE D-continued
Table D shows possible stabilisers that are optionally added to the mixtures according to the invention, preferably in amounts of 0.001 to 8 wt.- %, especially preferred in amounts of 0.05 to 5 wt.- % by weight based on the final mixture.
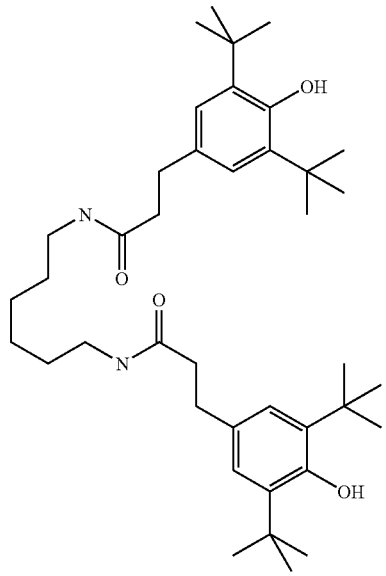
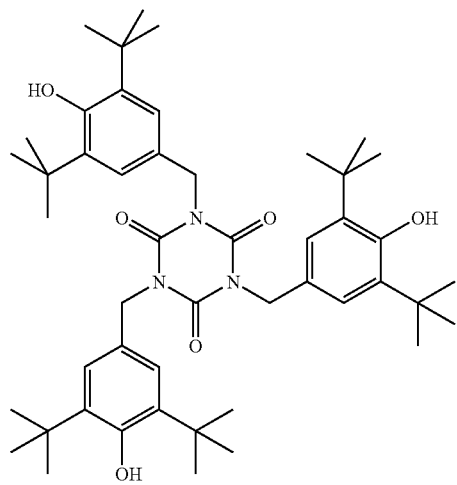
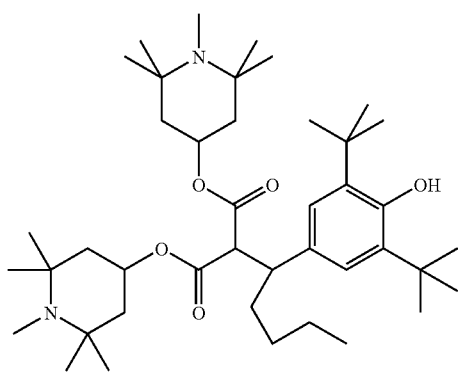

TABLE D-continued
Table D shows possible stabilisers that are optionally added to the mixtures according to the invention, preferably in amounts of 0.001 to 8 wt.- %, especially preferred in amounts of 0.05 to 5 wt.- % by weight based on the final mixture.
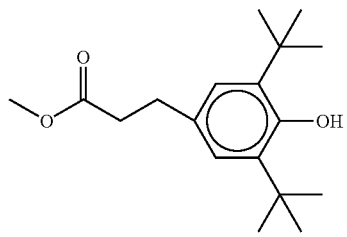
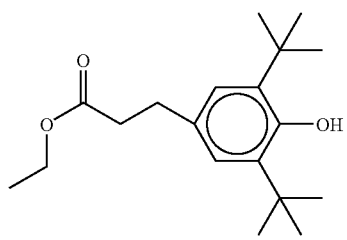
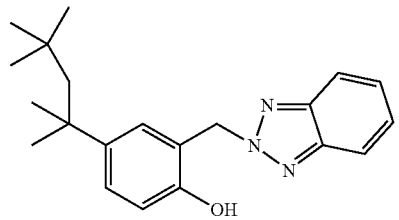
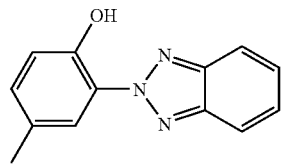
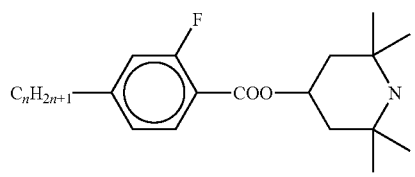
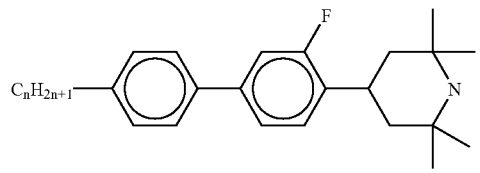
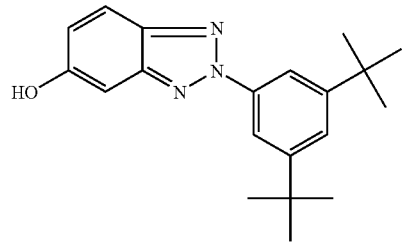

TABLE D-continued
Table D shows possible stabilisers that are optionally added to the mixtures according to the invention, preferably in amounts of 0.001 to 8 wt.- %, especially preferred in amounts of 0.05 to 5 wt.- % by weight based on the final mixture.
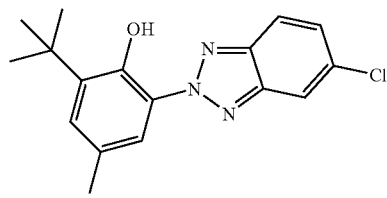
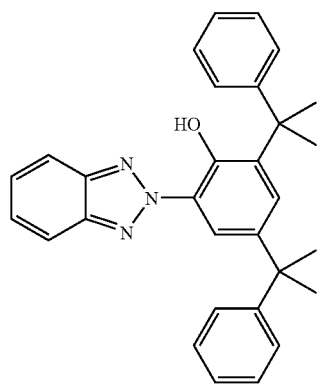
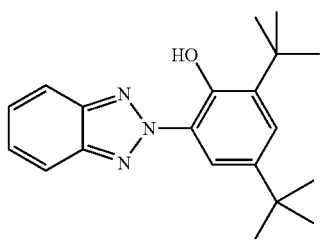
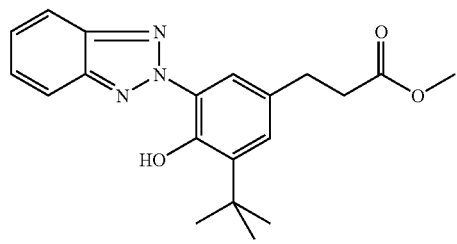
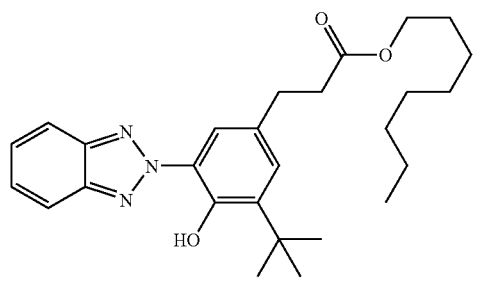

TABLE D-continued
Table D shows possible stabilisers that are optionally added to the mixtures according to the invention, preferably in amounts of 0.001 to 8 wt.- %, especially preferred in amounts of 0.05 to 5 wt.- % by weight based on the final mixture.
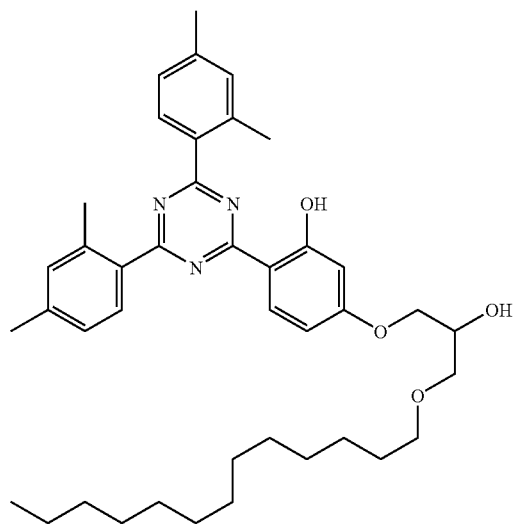
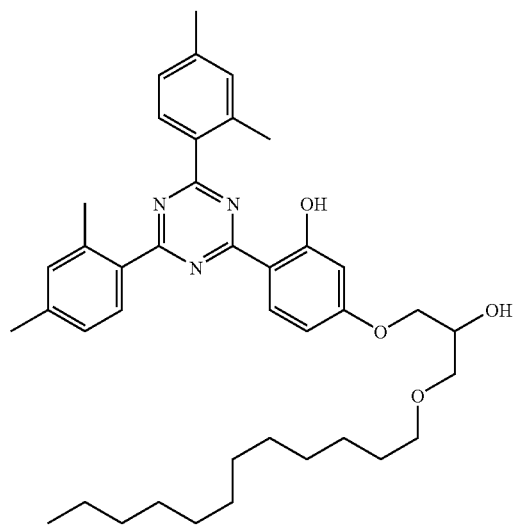
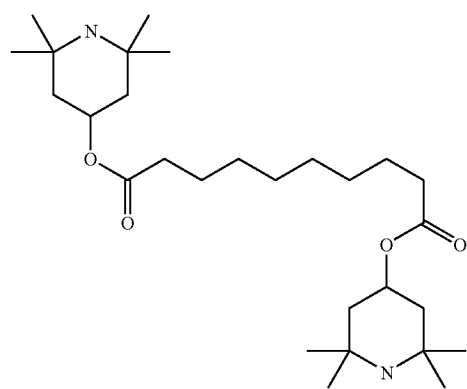

TABLE D-continued

Table D shows possible stabilisers that are optionally added to the mixtures according to the invention, preferably in amounts of 0.001 to 8 wt.- %, especially preferred in amounts of 0.05 to 5 wt.- % by weight based on the final mixture.

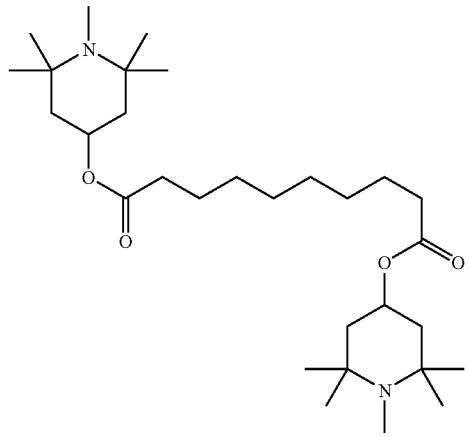

Besides one or more compounds of the formula I, particularly preferred mixtures comprise one, two, three, four, five or more compounds from Table B.

It will be appreciated that variations to the foregoing embodiments of the invention can be made while still falling within the scope of the invention. Each feature disclosed in this specification, unless stated otherwise, may be replaced by alternative features serving the same, equivalent or similar purpose. Thus, unless stated otherwise, each feature disclosed is one example only of a generic series of equivalent or similar features.

All of the features disclosed in this specification may be combined in any combination, except combinations where at least some of such features and/or steps are mutually exclusive. In particular, the preferred features of the invention are applicable to all aspects of the invention and may be used in any combination. Likewise, features described in non-essential combinations may be used separately (not in combination).

It will be appreciated that many of the features described above, particularly of the preferred embodiments, are inventive in their own right and not just as part of an embodiment of the present invention. Independent protection may be sought for these features in addition to or alternative to any invention presently claimed.

The invention will now be described in more detail by reference to the following examples, which are illustrative only and do not limit the scope of the invention.

Unless stated otherwise, percentages are percent by weight. All temperatures are given in degrees Celsius. m.p. denotes melting point, cl.p.=clearing point. Furthermore, C=crystalline state, N=nematic phase, S=smectic phase and I=isotropic phase. The data between these symbols represent the transition temperatures. Δn denotes the optical anisotropy and $n_o$ the ordinary refractive index (589 nm, 20° C.). The flow viscosity $v_{20}$ (mm²/sec) and the rotational viscosity $\gamma_1$ [mPa·s] were each determined at 20° C. $V_{10}$ denotes the voltage for 10% transmission (viewing angle perpendicular to the plate surface). $t_{on}$ denotes the switch-on time and $t_{off}$ the switch-off time at an operating voltage corresponding to 2 times the value of $V_{10}$. Δ∈ denotes the dielectric anisotropy (Δ∈=∈∥−∈⊥, where ∈∥ denotes the dielectric constant parallel to the longitudinal molecular axes and ∈⊥ denotes the dielectric constant perpendicular thereto). The electro-optical data were measured in a TN cell at the 1st minimum (i.e. at a d·Δn value of 0.5 μm) at 20° C., unless expressly stated otherwise. The optical data were measured at 20° C., unless expressly stated otherwise.

Throughout this application, unless explicitly stated otherwise, all concentrations are given in mass percent and relate to the respective complete mixture, all temperatures are given in degrees centigrade (Celsius) and all differences of temperatures in degrees centigrade. All physical properties are determined according to "Merck Liquid Crystals, Physical Properties of Liquid Crystals", Status November 1997, Merck KGaA, Germany and are given for a temperature of 20° C., unless explicitly stated otherwise. The optical anisotropy (Δn) is determined at a wavelength of 589.3 nm. The dielectric anisotropy (Δ∈) is determined at a frequency of 1 kHz. The threshold voltages, as well as all other electro-optical properties are determined with test cells prepared at Merck KGaA, Germany. The test cells for the determination of Δ∈ have a cell gap of approximately 20 μm. The electrode is a circular ITO electrode with an area of 1.13 cm² and a guard ring. The orientation layers are lecithin for homeotropic orientation (∈∥) and polyimide AL-1054 from Japan Synthetic Rubber for homogeneous orientation (∈⊥). The capacities are determined with a frequency response analyser Solatron 1260 using a sine wave with a voltage of 0.3 $V_{rms}$. The light used in the electro-optical measurements is white light. The set up used is commercially available equipment of Otsuka, Japan. The characteristic voltages are determined under perpendicular observation. The threshold ($V_{10}$)—mid grey ($V_{50}$)—and saturation ($V_{90}$) voltages are determined for 10%, 50% and 90% relative contrast, respectively.

COMPARISON EXAMPLE 1

| | |
|---|---|
| GGP-3-Cl | 4.50% |
| CCP—2F•F•F | 6.00% |
| CCP—3F•F•F | 10.00% |
| PGU-2-F | 4.00% |
| PGU-3-F | 4.00% |

-continued

| | |
|---|---|
| PUQU-2-F | 5.00% |
| PUQU-3-F | 5.00% |
| CCQU-3-F | 8.00% |
| CCQU-5-F | 8.00% |
| CC-3-V1 | 8.00% |
| CC-3-V | 30.00% |
| PCH-301 | 1.50% |
| CBC-33 | 3.00% |
| CBC-53 | 3.00% |
| Clearing point [° C.]: | 73.5 |
| Δn [589 nm, 20° C.]: | 0.0948 |
| Δε [1 kHz, 20° C.]: | 7.9 |
| $V_{10}$ [V, 20° C.]: | 1.44 |
| $γ_1$ [mPa · s, 20° C.]: | 72 |

EXAMPLE 1

The 4-ring alkyl compounds CBC-nm in the mixture of comparison example 1 are replaced by the 4-ring alkenyl compound CPPC-V-V of formula I according to the present invention. The rotational viscosity of the resulting mixture is 5% lower than in the mixture of comparison example 1, whilst the clearing temperature can be maintained:

| | |
|---|---|
| GGP-3-Cl | 4.50% |
| CCP—2F•F•F | 6.00% |
| CCP—3F•F•F | 10.00% |
| PGU-2-F | 4.00% |
| PGU-3-F | 4.00% |
| PUQU-2-F | 5.00% |
| PUQU-3-F | 5.00% |
| CCQU-3-F | 8.00% |
| CCQU-5-F | 8.00% |
| CCP—V-1 | 4.00% |
| CC-3-V1 | 8.00% |
| CC-3-V | 28.00% |
| PCH-301 | 1.50% |
| CPPC—V—V | 4.00% |
| Clearing point [° C.]: | 73.0 |
| Δn [589 nm, 20° C.]: | 0.0955 |
| Δε [1 kHz, 20° C.]: | 8.0 |
| $V_{10}$ [V, 20° C.]: | 1.42 |
| $γ_1$ [mPa · s, 20° C.]: | 69 |

EXAMPLE 2

The 4-ring alkyl compounds CBC-nm in the mixture of comparison example 1 are replaced by the 4-ring alkenyl compound CPPC-V-V of formula I according to the present invention. The rotational viscosity of the resulting mixture is 5% lower than in the mixture of comparison example 1, whilst the clearing temperature can be maintained:

| | |
|---|---|
| GGP-3-Cl | 4.50% |
| CCP—2F•F•F | 6.00% |
| CCP—3F•F•F | 9.00% |
| PGU-2-F | 4.00% |
| PGU-3-F | 4.00% |
| PUQU-2-F | 5.00% |
| PUQU-3-F | 5.00% |
| CCQU-3-F | 8.00% |
| CCQU-5-F | 8.00% |
| CCP—V-1 | 2.00% |
| CC-3-V1 | 9.00% |
| CC-3-V | 29.00% |
| PCH-301 | 1.50% |
| CPPC—V—V | 5.00% |
| Clearing point [° C.]: | 73.0 |
| Δn [589 nm, 20° C.]: | 0.0958 |
| Δε [1 kHz, 20° C.]: | 7.8 |
| $V_{10}$ [V, 20° C.]: | 1.43 |
| $γ_1$ [mPa · s, 20° C.]: | 67 |

COMPARISON EXAMPLE 2

| | |
|---|---|
| CCP—20CF$_3$ | 3.00% |
| CCP—30CF$_3$ | 4.00% |
| PGU-3-F | 10.00% |
| PUQU-3-F | 10.00% |
| CC-3-V1 | 13.00% |
| CC-3-V | 32.00% |
| CCP—V-1 | 10.00% |
| CCGU-3-F | 2.00% |
| PP-1-2V1 | 10.00% |
| CBC-33 | 3.00% |
| CBC-53 | 3.00% |
| Clearing point [° C.]: | 75.5 |
| Δn [589 nm, 20° C.]: | 0.1075 |
| Δε [1 kHz, 20° C.]: | 4.8 |
| $V_{10}$ [V, 20° C.]: | 2.03 |
| $γ_1$ [mPa · s, 20° C.]: | 58 |

EXAMPLE 3

The 4-ring alkyl compounds CBC-nm in the mixture of comparison example 2 are replaced by the 4-ring alkenyl compound CPPC-V-V of formula I according to the present invention. The rotational viscosity of the resulting mixture is 4% lower than in the mixture of comparison example 2, whilst the clearing temperature can almost be maintained:

| | |
|---|---|
| CCP—20CF$_3$ | 3.00% |
| CCP—30CF$_3$ | 4.00% |
| PGU-3-F | 10.00% |
| PUQU-3-F | 10.00% |
| CC-3-V1 | 12.00% |
| CC-3-V | 31.00% |
| CCP—V-1 | 14.00% |
| CCGU-3-F | 2.00% |
| PP-1-2V1 | 10.00% |
| CPPC—V—V | 4.00% |
| Clearing point [° C.]: | 74.5 |
| Δn [589 nm, 20° C.]: | 0.1077 |
| Δε [1 kHz, 20° C.]: | 4.8 |
| $V_{10}$ [V, 20° C.]: | 2.01 |
| $γ_1$ [mPa · s, 20° C.]: | 54 |

The invention claimed is:

1. Liquid crystalline medium contains one or more compounds of formula I,

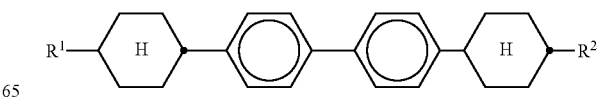

wherein
R¹ and R² are independently of one another an alkenyl or alkenyloxy group having from 2 to 9 carbon atoms.

2. Medium according to claim 1, characterized in that it contains additionally one or more compounds of formula II,

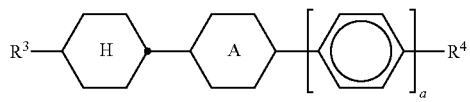

wherein
A is 1,4-phenylene or trans-1,4-cyclohexylene,
a is 0 or 1,
R³ is an alkenyl group having from 2 to 9 carbon atoms, and
R⁴ is an alkyl group having from 1 to 12 carbon atoms which is unsubstituted, monosubstituted by CN or CF₃ or at least mono-substituted by halogen, wherein one or more CH₂ groups are optionally, in each case independently of one another, replaced by —O—, —S—,

—CH=CH—, —C≡C—, —CO—, —CF₂O—, —OCF₂—, —CO—O—, —O—CO— or —O—CO—O— in such a way that O atoms are not linked directly to one another.

3. Medium according to claim 1, characterized in that it additionally contains one or more compounds selected from the group consisting of the general formulae III, IV, V, VI and VII

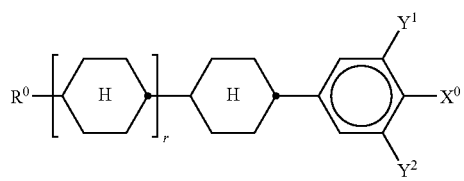

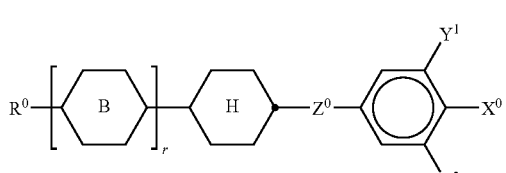

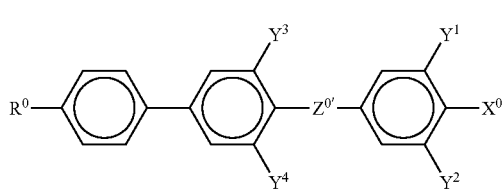

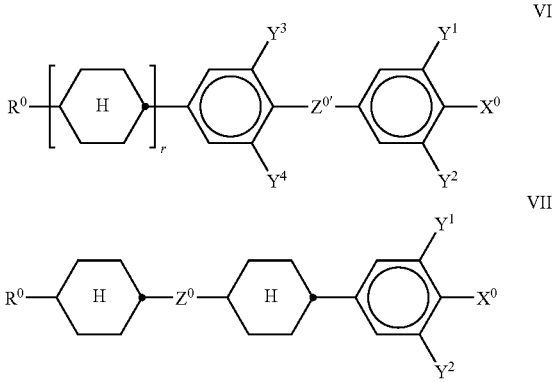

wherein the individual radicals have the following meanings:
R⁰ is n-alkyl, alkoxy, oxaalkyl, fluoroalkyl or alkenyl, alkenyloxy, each having up to 9 carbon atoms,
X⁰ is F, Cl, halogenated alkyl, halogenated alkenyl, halogenated alkenyloxy or halogenated alkoxy having from 1 to 6 carbon atoms,
Z⁰ is —C₂H₄—, —(CH₂)₄—, —CH=CH—, —CF=CF—, —C₂F₄—, —CH₂CF₂—, —CF₂CH₂—, —CH₂O—, —OCH₂—, —COO—, —OCF₂— or —CF₂O—,
Z⁰' is —C₂H₄—, —(CH₂)₄—, —CH=CH—, —CF=CF—, —C₂F₄—, —CH₂CF₂—, —CF₂CH₂—, —CH₂O—, —OCH₂—, —COO—, —OCF₂—, —CF₂O— or single bond
Y¹ to Y⁴ are independently of one another H or F,
r is 0 or 1, and

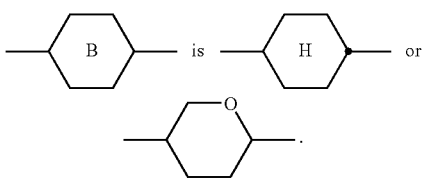

4. Medium according to claim 1, characterized in that it additionally contains one or more compounds of the following formula

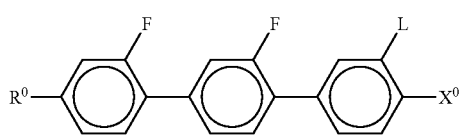

wherein
R⁰ is n-alkyl, alkoxy, oxaalkyl, fluoroalkyl or alkenyl, alkenyloxy, each having up to 9 carbon atoms, and
X⁰ is F, Cl, halogenated alkyl, halogenated alkenyl, halogenated alkenyloxy or halogenated alkoxy having from 1 to 6 carbon atoms,
and L is H or F.

5. Medium according to claim 1, characterized in that it additionally contains one or more compounds selected from the following formula,

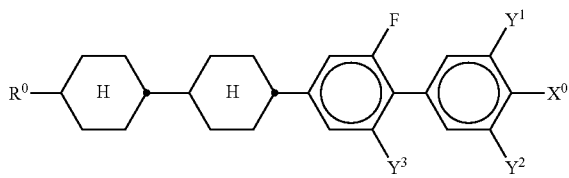

wherein
R⁰ is n-alkyl, alkoxy, oxaalkyl, fluoroalkyl or alkenyl, alkenyloxy, each having up to 9 carbon atoms, and
X⁰ is F, Cl, halogenated alkyl, halogenated alkenyl, halogenated alkenyloxy or halogenated alkoxy having from 1 to 6 carbon atoms and
Y¹ to Y³ are independently of one another H or F.

6. Medium according to claim 1, characterized in that it additionally contains one or more compounds selected from the following formula

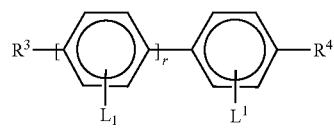

wherein
R³ is an alkenyl group having from 2 to 9 carbon atoms, and
R⁴ is an alkyl group having from 1 to 12 carbon atoms which is unsubstituted, monosubstituted by CN or CF₃ or at least monosubstituted by halogen, wherein one or more CH₂ groups are optionally, in each case independently of one another, replaced by —O—, —S—,

—CH=CH—, —C≡C—, —CO—, —CF₂O—, —OCF₂—, —CO—O—, —O—CO— or —O—CO—O— in such a way that O atoms are not linked directly to one another,
r is 1 or 2,
L¹ and L² are each independently H or F.

7. Medium according to claim 1, characterized in that it additionally contains one or more compounds selected from the following formula

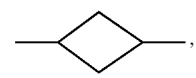

wherein R⁵ and R⁶ are independently one of an alkyl group having from 1 to 12 carbon atoms which is unsubstituted, monosubstituted by CN or CF₃ or at least monosubstituted by halogen, wherein one or more CH₂ groups are optionally, in each case independently of one another, replaced by —O—, —S—,

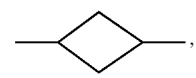

—CH=CH—, —C≡C—, —CO—, —CF₂O—, —OCF₂—, —CO—O—, —O—CO— or —O—CO—O— in such a way that O atoms are not linked directly to one another.

8. Medium according to claim 1, characterized in that the proportion of compounds of formula I in the medium is 1-15% by weight based on the total mixture.

9. Method of using a liquid crystal medium according to claim 1 comprising employing said liquid crystal medium in an electro-optical liquid crystal display.

10. Electro-optical liquid crystal display containing a liquid crystal medium according to claim 1.

* * * * *